United States Patent
Marathe et al.

(10) Patent No.: US 10,691,559 B2
(45) Date of Patent: Jun. 23, 2020

(54) PERSISTENT MEMORY TRANSACTIONS WITH UNDO LOGGING

(71) Applicant: Oracle International Corporation, Redwood City, CA (US)

(72) Inventors: Virendra J. Marathe, Florence, MA (US); Margo I. Seltzer, Lincoln, MA (US); Steve Byan, Littleton, MA (US)

(73) Assignee: Oracle International Corporation, Redwood City, CA (US)

( * ) Notice: Subject to any disclaimer, the term of this patent is extended or adjusted under 35 U.S.C. 154(b) by 225 days.

(21) Appl. No.: 15/675,526

(22) Filed: Aug. 11, 2017

(65) Prior Publication Data

US 2018/0046556 A1 Feb. 15, 2018

Related U.S. Application Data

(60) Provisional application No. 62/375,417, filed on Aug. 15, 2016.

(51) Int. Cl.
*G06F 11/00* (2006.01)
*G06F 11/14* (2006.01)
(Continued)

(52) U.S. Cl.
CPC .......... *G06F 11/1474* (2013.01); *G06F 3/061* (2013.01); *G06F 3/0604* (2013.01);
(Continued)

(58) Field of Classification Search
CPC ..... G06F 11/1474; G06F 3/0604–0688; G06F 9/467; G06F 11/1004; G06F 12/023;
(Continued)

(56) References Cited

U.S. PATENT DOCUMENTS 7,277,900 B1 * 10/2007 Ganesh ............... G06F 16/2477
707/682
7,383,290 B2 6/2008 Mehra et al.
(Continued)

OTHER PUBLICATIONS

Virendra J. Marathe, et al., "Adaptive Software Transctional Memory*", International Symposium on Distributed Computing, Springer, 2005, pp. 354-368.
(Continued)

*Primary Examiner* — Sarai E Butler
(74) *Attorney, Agent, or Firm* — Robert C. Kowert; Kowert, Hood, Munyon, Rankin & Goetzel, P.C.

(57) ABSTRACT

Undo logging for persistent memory transactions may permit concurrent transactions to write to the same persistent object. After an undo log record has been written, a single persist barrier may be issued. The tail pointer of the undo log may be updated after the persist barrier, and without another persist barrier, so the tail update may be persisted when the next log record is written and persisted. Undo logging for persistent memory transactions may rely on inferring the tail of an undo log after a failure rather than relying on a guaranteed correct tail pointer based on persisting the tail after every append. Additionally, transaction version numbers and checksum information may be stored to the undo log enabling failure recovery.

20 Claims, 19 Drawing Sheets

(51) Int. Cl.
| | |
|---|---|
| *G06F 11/10* | (2006.01) |
| *G06F 12/0804* | (2016.01) |
| *G06F 9/46* | (2006.01) |
| *G06F 3/06* | (2006.01) |
| *G06F 12/02* | (2006.01) |
| *G06F 12/0811* | (2016.01) |

(52) U.S. Cl.
CPC .............. *G06F 3/065* (2013.01); *G06F 3/068* (2013.01); *G06F 3/0631* (2013.01); *G06F 3/0646* (2013.01); *G06F 3/0652* (2013.01); *G06F 3/0659* (2013.01); *G06F 3/0688* (2013.01); *G06F 9/467* (2013.01); *G06F 11/1004* (2013.01); *G06F 11/14* (2013.01); *G06F 12/023* (2013.01); *G06F 12/0804* (2013.01); *G06F 12/0811* (2013.01); *G06F 2201/805* (2013.01); *G06F 2201/82* (2013.01); *G06F 2212/1044* (2013.01)

(58) Field of Classification Search
CPC ............. G06F 12/0804; G06F 12/0811; G06F 2201/805; G06F 2201/82; G06F 2212/1044; G06F 11/1402; G06F 11/1469
USPC .......................................................... 714/19
See application file for complete search history.

(56) References Cited

U.S. PATENT DOCUMENTS

| | | | |
|---|---|---|---|
| 8,589,621 B2 | 11/2013 | Wang et al. | |
| 9,081,606 B2 | 7/2015 | Carpenter et al. | |
| 9,367,472 B2 | 6/2016 | Bridge, Jr. et al. | |
| 9,946,492 B2 | 4/2018 | Diestelhorst et al. | |
| 10,007,581 B2 | 6/2018 | Marathe | |
| 2001/0032300 A1 | 10/2001 | Olson | |
| 2003/0208500 A1* | 11/2003 | Daynes | G06F 16/289 |
| 2011/0106776 A1* | 5/2011 | Vik | G06F 9/451 707/698 |
| 2014/0067761 A1* | 3/2014 | Chakrabarti | G06F 16/2336 707/634 |
| 2014/0075943 A1* | 3/2014 | Jung | F02M 21/0227 60/651 |
| 2014/0195480 A1* | 7/2014 | Talagala | G06F 12/0804 707/610 |
| 2014/0258777 A1* | 9/2014 | Cheriton | G06F 11/1471 714/19 |
| 2015/0261461 A1 | 9/2015 | Li et al. | |
| 2015/0261463 A1* | 9/2015 | Chakrabarti | G06F 9/3863 711/103 |
| 2016/0092113 A1 | 3/2016 | Veal et al. | |
| 2016/0344834 A1* | 11/2016 | Das | H04L 67/2842 |
| 2016/0350216 A1 | 12/2016 | Shu et al. | |

OTHER PUBLICATIONS

Dhruva R> Chakrabarti, et al., "Atlas: Leveraging Locks for Non-volatile Memory Consistency", HP, ACM SIGPLAN Notices 49, No. 10, Internal Posting Jan. 21, 2014, pp. 433-452.
Aasheesh Kolli, et al., "High-Performance Transactions for Persistent Memories", ACM, ASPLOS '16, Apr. 2-6, 2016, pp. 1-13.
Haris Volos, et al., "Mnenosyne: Lightweight Persistent Memory", ACM, ASPLOS '11, Mar. 5-11, 2011, pp. 1-13.
Iulian Moraru, et al., "Consistent, Durable, and Safe Memory Management for Byte0addressable Non Volatile Main Memory", ACM, TRIOS '13, Nov. 3, 2013 pp. 1-17.
Joel Coburn, et al., NV-Heaps: Making Persistent Objects Fast and Safe with Next-Generation, Non-Volatile Memories, ACM, ASPLOS '11, Mar. 5-11, 2011, pp. 1-13.
Maurice Herlihy, et al, "Software Transactional Memory for Dynamic-Sized Data Structures", ACM, PODC 2003, Jul. 13-16, 2003, pp. 1-10.
Ellis R. Giles, et al., "SoftWrAP: A Lightweight Framework for Transactional Support of Storage Class Memory*", IEEE, Copyright 2015, pp. 1-14.
U.S. Appl. No. 15/675,533, filed Aug. 11, 2017, Marathe et al.
U.S. Appl. No. 15/675,528, filed Aug. 11, 2017 Marathe et al.

* cited by examiner

US 10,691,559 B2

PERSISTENT MEMORY TRANSACTIONS WITH UNDO LOGGING

This application claims benefit of priority of U.S. Provisional Application Ser. No. 62/375,417 titled "Persistent Memory Transactions" filed Aug. 15, 2016, the content of which is incorporated by reference herein in its entirety.

BACKGROUND

Field of the Disclosure

This disclosure relates generally to programming systems for byte-addressable persistent memory, and more particularly to systems and methods for improving performance for persistent transactions and reducing persist barriers within transactions.

Description of the Related Art

Persistent memory poses interesting challenges in that even though the technologies guarantee persistence, the rest of a system's memory hierarchy may be nonpersistent. As a result, allocating or deallocating memory using traditional nonpersistent memory allocators may not work—especially when failures occur. If a failure occurs, an allocation/deallocation's effects may have to be rolled back. Efficiently updating and persisting an allocator's metadata to persist the allocation/deallocation effects is nontrivial.

Additionally, Transactions are emerging as a viable programming interface to access and modify data hosted on byte addressable persistent memory dual in-line memory modules (DIMMS). The interactions between transactions and persist barriers that are required to persist writes involves various tradeoffs. Traditionally, transaction runtimes ignore the overhead associated with persist barriers.

SUMMARY

Methods, techniques, apparatus and systems for implementing undo logging for persistent memory transactions are disclosed. Undo logging may, in some embodiments, permit concurrent transactions to write to the same object, assuming that the application employs proper synchronization to prevent data races. Traditional implementations of appending records to an undo log frequently require two persist barriers—one to persist the new log record and one to change the log's tail pointer. Thus, traditional approaches may lead to 2N persist barriers for N appends, resulting in higher overheads.

In some embodiments, undo logging for persistent memory transactions may rely on inferring the tail of an undo log after a failure rather than relying on a guaranteed correct tail pointer based on persisting the tail after every append. Undo logging as described herein may utilize (or incur) a single persist barrier per undo log append as opposed to the (at least) 2 persist barriers existing traditional undo log implementations incur. This may reduce the number of persist barriers of read-write transactions by almost 50%—leading to significant latency improvements.

After an undo log record has been written, a single persist barrier may be issued, according to some embodiments. According to some embodiments, checksum information included in undo log records be utilized to verify undo log record after a failure. If a failure occurs before or during execution of the persist barrier, and only part of the undo record has been persisted, a checksum mismatch may be detected during recovery. The log tail pointer may also be maintained, but it may be updated after the persist barrier, so the tail update may be guaranteed to persist on or before the next record write and persist.

Figure 1:
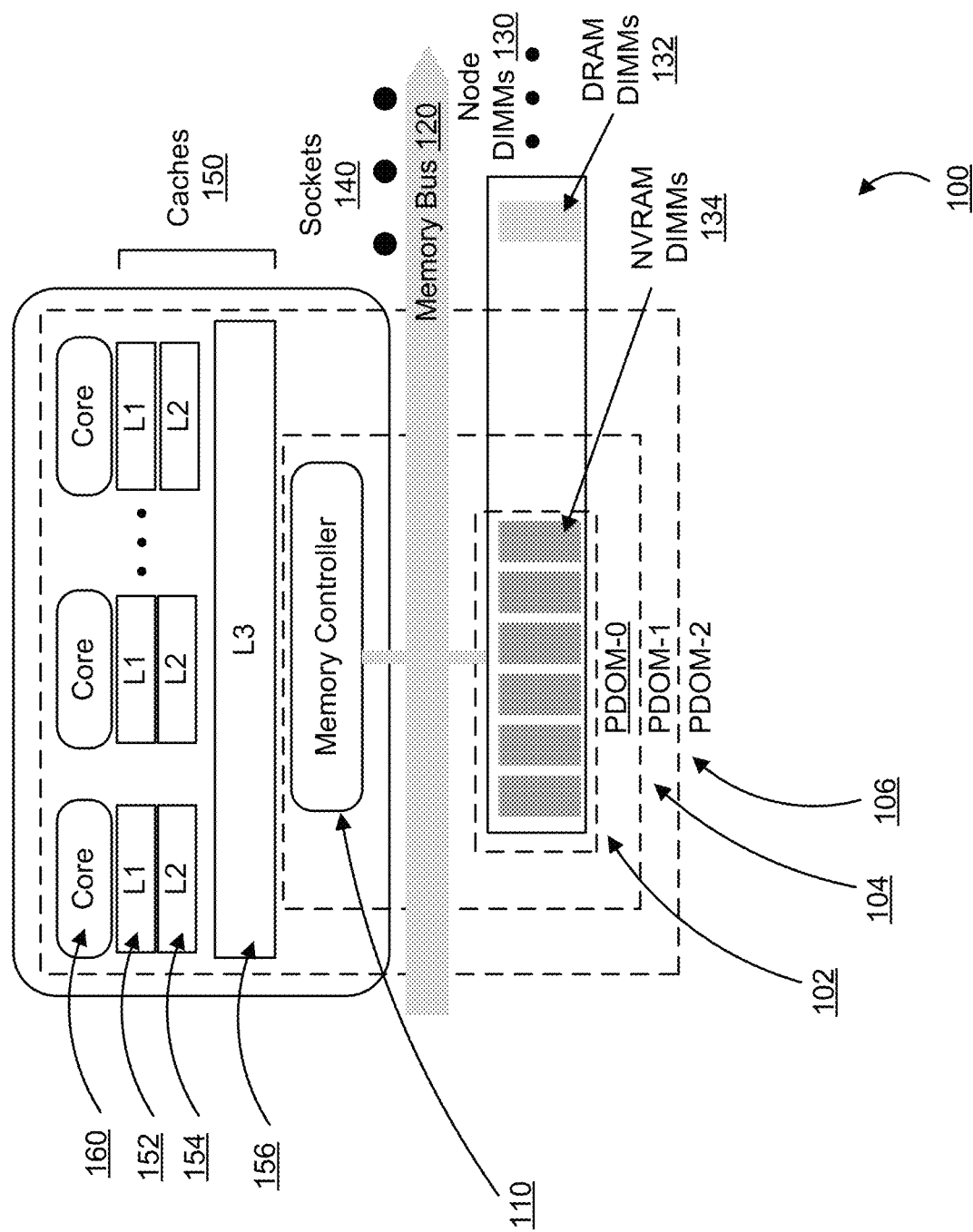
FIG. 1 is a logical block diagram illustrating persistence domains of a processor socket that hosts persistent memory DIMMs, according to one embodiment.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, transactions are emerging as a viable programming interface for byte addressable persistent memory. The interaction of transactions with persist barriers that may be required to persist writes frequently introduces new tradeoffs. Multiple algorithms, including, but not limited to, undo logging, redo logging, and copy-on-write based transactions are discussed herein. In some embodiments, these algorithms may be implemented to reduce the number of persist barriers that are used per transaction. Some embodiments may involve a memory allocator optimized to significantly reduce or eliminate persist barriers when persisting an allocator's state.

While the nature of individual workloads may be an important performance factor, the size of a system's persistence domain (e.g., the portion of the memory hierarchy where the data is effectively persistent) may also have significant implications on performance. For instance, no single transaction implementation choice may outperform others across all workloads. Additionally, runtimes may exhibit different cache locality behaviors, which may also affect performance, according to different embodiments.

Introduction

Persistent memory technologies (e.g., spin-transfer torque MRAM, STT-MRAM, memristors, Intel and Micron Technologies' 3D XPoint persistent memory technology) may possess a combination of characteristics with the potential to profoundly change how persistent data is managed. Persistent memory technologies may offer the persistence of flash with the byte addressability and performance of DRAM (100-1000× faster than state-of-the-art NAND flash). All these technologies are byte addressable as opposed to the block-addressed nature of disks and NAND flash memory. This byte addressability may, in some embodiments, lend itself toward integrating non-volatile memories in systems on the memory bus, rather than only across an I/O interface.

The combination of byte addressability and performance may allow accessing persistent data via load/store instructions rather than through a traditional file system interface, according to some embodiments. In particular, byte-addressability may enable a DRAM-like load/store interface to persistence, which in turn may provide opportunities to represent persistent data in an in-memory form as opposed to the traditional approach of marshalling the data in streams and blocks adapted to the block-based interface of magnetic disks and NAND flash memory.

Byte addressability may introduce new challenges, such as because a simple store may not immediately persist data. For example, processor state and various layers or the memory hierarchy (e.g., store buffers, caches, memory controller buffers) may be expected to remain nonpersistent for the foreseeable future. Although, new hardware instructions (e.g., to flush or write cache lines back to lower layers on the memory hierarchy) and new forms of persist barrier instructions (e.g., that can be used to order persistence of stores) may be utilized. However, even with these new instructions, correctly writing programs to use them may remain a daunting task. The example pseudocode below illustrates this challenge—the programmer must correctly order the persisting of updates to various pieces of the application's persistent data structures. In some cases, omission of even a single flush, write back, or persist barrier instruction may result in persistent data inconsistencies in the face of failures.

As used herein a persist barrier refers to a mechanism that ensures consistency and persistence of data according to a particular ordering, which may vary according to the particular persist barrier mechanism. In some embodiments, a persist barrier may represent a particular instruction (or set of instructions) that may ensure that writes (e.g., stores) to persistent memory that occur prior to the persist barrier the are persisted prior to writes that occur after the persist barrier, thus enforcing the ordering of the writes (e.g., as persisted). Additionally, a persist barrier may implement cache lines write backs and/or cache line flushes. Certain instruction sequences (e.g., such as clwb, clflush, or clushopt, followed by sfence or mfence) may comprise a persist barrier in some embodiments.

The following example pseudocode illustrates potential complexities of programming with just the hardware instructions for persisting data.

```
struct foo {
    ...
    void *p;
    ...
}
foo *f;
...
// *f and clone(obj) are persistent
f->p = clone(obj);
```

In the above example, p is a pointer embedded in the persistent instance of foo. Clone clones its argument object (obj). The programmer must persist this clone before p's assignment, otherwise an untimely failure could result in a state where the clone is not persisted but p's new value is persisted.

The combination of a load/store interface to storage and high overheads of persist barriers may represent a significant change from the traditional transaction settings of both databases and memory transactions, according to some embodiments. As such, it may have significant implications on performance tradeoffs between various implementation approaches. One objective of the techniques described herein may be considered to explicitly reduce the number of persist barriers in transactions.

A load/store interface to persistent memory may not be sufficient since the processor state and various layers in the memory hierarchy (viz. store buffers, caches, memory controller buffers) are expected to remain nonpersistent in the foreseeable future. Applications need better primitives to control when data moves through the memory hierarchy layers to the persistent memory DIMMs. New hardware instructions allow cache lines to be flushed and/or written back to lower layers in the memory hierarchy (i.e. memory controller buffers). Additionally, new forms of persist barrier instructions can be used by programmers to ensure that prior stores (e.g., writes) to persistent memory are persisted before subsequent stores. However, even with these new instructions, the programmer's task to write programs that persist data correctly remains daunting.

Persistent memory transactions routinely allocate and deallocate persistent objects. Traditional approaches to persistent memory management frequently lead to a multitude of persist barriers per allocation call. Described herein are methods, techniques and systems for implementing persistent memory allocator that requires at most 2 memory management related persist barriers in transactions, according to various embodiments. In some embodiments, an allocator's persistent metadata (i.e., metadata associated with memory blocks that were allocated/freed) is lazily persisted when the enclosing transaction commits. Lazily persisting the allocator's persistent metadata may deliver significant performance gains according to various embodiments.

Consider the implications of persistence domains on persist barrier overheads. In some embodiments, a persistence domain may be considered a portion of the memory hierarchy considered to be "effectively persistent"—the underlying hardware/software system may ensure that data that reaches its persistence domain is written to the persistent media before the system is shut down (e.g., either planned shutdown or shutdown due to failures). A new taxonomy of persistence domain choices enabled by different hardware systems is described herein according to various embodiments.

A comprehensive investigation of implementation choices for persistent memory transactions with the focus on how transaction writes are implemented is described herein. The techniques described herein may include, without limitation, undo logging, redo logging, and copy-on-write (COW) based transaction runtimes, according to various embodiments. Runtimes may, in some embodiments, be carefully designed to reduce the number of persist barriers executed within a transaction. In some embodiments, the number of persist barriers needed for undo logging implementation may be reduced by almost 50% relative to prior approaches. In other embodiments, committing transactions using both redo logging and COW implementations may require only four persist barriers.

A new memory management algorithm is described herein according to various embodiments. The new memory management algorithm may be optimized to reduce persist barriers during allocation and deallocation. The algorithm may, in some embodiments, eliminate all persist barriers related to memory allocation/deallocation in redo logging and COW transactions and may require just two additional persist barriers per transaction in the undo logging transactions irrespective of how many allocation/deallocation calls are made in a transaction.

Comprehensive microbenchmark based evaluations, according to different embodiments, demonstrate how different aspects of the transaction runtime, memory allocator, and persistence domains may collectively influence performance of a wide range of workloads. In some embodiments, no single implementation may dominate the others across all workloads. Thus, performance may be considered a function of both the workload and the persistence domain. Various memory management algorithms, as well as undo logging, redo logging and copy-on-write based transaction runtimes, are discussed herein in the context of three "real world" workloads: (i) a key-value store developed from scratch, (ii) a port of SQLite, and (iii) a port of memcached.

Persistence Domain

While data hosted in persistent memory DIMMs may be expected to survive power failures, the rest of the memory hierarchy (e.g. processor caches, memory controller buffers, etc.) may be considered fundamentally not persistent. However, various system solutions may make various parts of the memory hierarchy "effectively persistent". For instance, in battery backed systems, where the caches can be flushed out to persistent memory DIMMs on power failure, the whole memory hierarchy may effectively become, and may be considered, persistent. Another example is the asynchronous DRAM refresh (ADR) feature provided by many modern processors, in which the memory controller buffers may be flushed out to memory DIMMs on power failure. With the ADR feature, the memory controller buffers may be considered effectively persistent in some embodiments since the data may be guaranteed to persist (e.g., discounting ADR hardware failures). There may be other ways to slice the memory hierarchy into persistent and non-persistent parts, according to various embodiments.

The portion of the memory hierarchy where data is effectively persistent may be referred to herein as the persistence domain. Persistence domains may be classified in three categories: PDOM-0, PDOM-1 and PDOM-2. In PDOM-0 persistency domains, just the persistent memory DIMMs may comprise the persistence domain. To persist stores, programs may be required to issue a high latency persist barrier (e.g. a pcommit instruction sequence) after the store. In PDOM-1 the persistence domain may include PDOM-0 and memory controller buffers. For example, Modern processors with ADR capabilities and persistent memory DIMMs may effectively support PDOM-1. To persist stores, cache line write backs or flushes (which send dirty cache lines to the memory controller) may need to be completed. Certain instruction sequences (e.g., such as clwb or cflushopt, followed by sfence) may comprise the persist barrier. PDOM-1 persist barriers may be expected to exhibit lower latency (potentially by up to an order of magnitude) than PDOM-0 persist barriers. In PDOM-2 persistence domains the entire memory hierarchy may be persistent. For example, battery backed systems may support PDOM-2 and in some embodiments the persist barrier may effectively become a no-op.

As shown in FIG. 1, a system 100 may include one or more sockets 140 communicating via memory bus 120, each of which may include one or more Node DIMMs 130, that in turn may include DRAM DIMMs 132 and NVRAM DIMMs 134. The system 100 may include one or more persistence domains that may be classified in various categories, including, but not limited to: PDOM-0 102, which may in some embodiments include only persistent memory DIMMs, PDOM-1 104, which may include PDOM-0 102 and one or more memory controller buffers 110, and PDOM-2 106, which may include the entire memory hierarchy as well as processor state information, such as store buffers, including persistent data, according to some embodiments. Additionally, system 100 may include and/or implement one or more cores 160 as well as one or more caches 150 including caches L1 152, L2 154 and L3 156, according to various embodiments. Different systems may support and/or include different types of persistence domains. For instance, many modern processors with ADR capabilities and persistent memory DIMMs may effectively support PDOM-1 104, while battery backed systems may support PDOM-2 106, according to different embodiments.

TABLE 1

Persistent memory writes and primitives for different persistence domains.

| | Persistence domains | | |
|---|---|---|---|
| Operations | PDOM-0 | PDOM-1 | PDOM-2 |
| Writes | store clwb/clflush-opt | store clwb/clflush-opt | store |

TABLE 1-continued

Persistent memory writes and primitives for different persistence domains.

| | Persistence domains | | |
|---|---|---|---|
| Operations | PDOM-0 | PDOM-1 | PDOM-2 |
| Ordering persists | sfence pcommit sfence | sfence | nop |

The persistence domain may, in some embodiments, affect the instruction sequence needed to persist updates. Table 1 depicts instructions that may be needed to persist these updates on processors with persistent memory. According to some embodiments, there may be two phases to a persistent update process: (i) The actual write (i.e., store) and (ii) the persist barrier. PDOM-0 102 and PDOM-1 104 may require a writeback or flush instruction, in addition to the store, to move data into the persistence domain. Both the clwb and clflush-opt may trigger asynchronous cache-line sized writes to the memory controller. They differ in that clflush-opt invalidates the cache line while clwb does not. In principle, the flush instructions may be delayed (e.g., for multiple store instructions to the same cache line). In practice, as they are asynchronous, starting the writeback sooner may speed up the persist barriers in the second phase of this process, in some embodiments. In PDOM-2 104, flush instructions may not be needed in some embodiments since store buffers and caches may be part of the persistence domain.

In PDOM-0 102, the persist barrier may need to ensure that all flushes have completed (the first sfence), and then force any updates in the memory controller to be written to the DIMMs (pcommit). As the pcommit may be asynchronous, persistence may require the second sfence to indicate when the pcommit has completed. In PDOM-1 104, according to some embodiments, the persist barrier may need to ensure that prior flushes have completed, since the memory controller 110 may reside inside the persistence domain. PDOM-2 104 may require no further action as data may be persisted as soon as it has been stored. The pcommit instruction is described herein as a concrete example of a PDOM-O persistence domain, according to one embodiment. Note that clwb, clflush-opt, and pcommit may have store semantics in terms of memory ordering, and applications may have to take care to avoid problematic reordering of loads with these instructions, such as by using sfence or other instructions with fence semantics in various embodiments.

Programming Model

A programming model, based on abstractions of persistent regions, data types, and transactions, is discussed herein regarding persistent memory transactions according to some embodiments.

Persistent Regions

A file system may be assumed to host all persistent data accessible to applications. According to some embodiments, applications may access persistent data directly via a persistent-region abstraction, such as by using a mmap interface. Each region may have its own heap and a user instantiated root pointer. Transactions may not span regions, but may access nonpersistent objects residing outside a region, in some embodiments. Thus, in some embodiments, an mmap-based lower level programming model is utilized to map persistent memory resident files directly in application address spaces. Additionally, a persistent region abstraction may be provided for applications to use mmapped files. Each region may have its heap and a user-instantiated root pointer. A region may host transactions that are expected to only access persistent objects of that region while being able to access nonpersistent objects residing outside the region. Pointers in a region can be nonpersistent, allowing them to point to nonpresistent objects residing outside the region.

In some embodiment, a persistent heap may provide allocator and deallocator functions to let applications allocate and deallocate blocks from the persistent region. For example, in some embodiments, pm_alloc and pm_free functions/macros may be utilized and may be modified to properly interact with persistent memory methods, techniques and systems described herein. In some embodiments, persistent memory compatible allocator and deallocators may only be used within transactions, such as to avoid memory leaks due to program crashes and other failures.

In some embodiments, persistent pointers (pointers residing in a region that point to persistent objects) may be implemented as self-relative offsets, (i.e., allowing compatibility with regions mapped to arbitrary virtual address ranges).

Persistent Memory Transactions:

Transactions and Accessors

Various semantic models for persistent memory transactions, such as failure-atomic transactions, may be utilized in various embodiments. Failure-atomic transactions, as described herein, may be considered to guarantee atomicity, i.e., "all-or-nothing" semantics across failure boundaries, relegating isolation and consistency maintenance to applications. Usage of failure-atomic transactions may ensure consistency of persistence data, while allowing applications to leverage semantic information in their synchronization approach. Assignment statement may be delineated by a transaction to guarantee failure atomicity. If isolation is needed, an application may enclose the transaction or its enclosing context in a critical section.

Language-level constructs may be used for transactions in the form of lexically scoped failure-atomic blocks. Persistent memory transactions may utilize a uniform interface in that the block of code that accesses and manipulates persistent memory is enclosed in a critical section or a special transaction block, as in the following example pseudocode:

```
failure_atomic {
    // code to access/modify persistent data
    ...
}
```

The effects of all updates to persistent data within the transaction are either all applied or all eliminated. Reads/writes of persistent data may be instrumented to calls into the transaction runtime. Code within transactions can also call allocator/deallocator functions (e.g., such as pm_alloc and pm_free), and their effects must also be applied and persisted with the all-on-nothing semantics, according to various embodiments.

A library-based interface to failure-atomic durable transactions is described herein. The library may include APIs for accessing complex data structures, as well as for beginning and ending transactions, according to some embodiments. The example pseudocode below illustrates the use of one example API according to one embodiment. Using such an API, various forms of transactional reads and writes (e.g., for individual fields, pointers, arbitrary sized buffers, etc.) as well as common memory buffer operators (e.g., memcpy, memcmp, and memset) may be implemented.

The following example pseudocode illustrates one example of a simple transaction that increments a counter in a persistent object:

```
struct foo {
    ...
    int cnt;
    ...
};
// pm_foo, the persistent version of type foo
DEFINE_PM_TYPE(foo);
// x points to an instance of pm_foo
pm_foo *x;
// failure-atomic transaction
pm_txn_t txn;
do {
    TXN_BEGIN(txn);
    // x->cnt++;
    int counter;
    // counter = x->cnt;
    TXN_READ(txn, x, cnt, &counter);
    counter++;
    // x->cnt = counter;
    TXN_WRITE(txn, x, cnt, &counter);
    // commit
    status = TXN_COMMIT(txn);
} while (status != TXN_COMMITTED);
```

In the above example, a persistent version of a type (pm_foo from previous example) using DEFINE_PM_TYPE is created. This may, in some embodiments, create an opaque persistent data type that encloses an argument type instance.

In some embodiments, nested transactions may be supported with flat-nesting semantics. Successful completion of a transaction (TXN_COMMIT returns TXN_COMMITTED status) may ensure that all updates made by the transaction to persistent memory have been persisted. If a failure occurs before the transaction commits, the transaction's effects may be rolled back during recovery, according to some embodiments. For ease of explanation, only the fail-stop failure model is discussed herein. Thus, a transaction may voluntarily roll back via the TXN_ABORT call. The control flow may, in some embodiments, need to be managed by the programmer explicitly (i.e., there may not be an automatic restart of the transaction after abort).

PM_UNWRAP may return a reference to the type instance wrapped within a persistent type instance. In some embodiments, programmers may directly access the "unwrapped" object's fields using loads/stores. This may avoid transactional instrumentation overheads wherever unnecessary (e.g., initializing a newly allocated object). The pm_foo instance from the example above is, in one example embodiment, unwrapped as follows:

```
foo *direct_x = PM_UNWRAP(x);
// no transactional instrumentation
direct_x->cnt = 0;
// write back and persist the update
pm_async_wb_loc(&direct_x->cnt,
    sizeof(direct_x->cnt));
pm_persist_barrier( );
```

In some embodiments, modifying the unwrapped object may make the programmer responsible for writing and persisting affected cache lines, using the primitives we provide. The persist barrier may be avoided if the code is executed within the scope of a transaction. For example, the transaction runtime may issue the appropriate persist barriers in its commit operation.

Concurrency Control

While, in some embodiments, failure-atomic transactions may not ensure isolation, these transactions may invoke critical sections that modify persistent objects. This can, in some embodiments, lead to scenarios where a transaction executes a critical section, modifying persistent objects, while the prior transaction that executed the same critical section, modifying the same persistent objects, has still not completed. The prior transaction's uncommitted writes may end up racing with the new transaction's reads/writes of these persistent objects. To aid isolation for such circumstances, in some embodiments, a facility of a deferred lock release may be provided, where the lock acquired for a critical section's execution may be released when the enclosing durable block completes its execution. While this may work in certain circumstances, in others it may lead to inflating critical sections, which in turn may lead to scalability bottlenecks or deadlocks. To address the scalability problem, in some embodiments deferred operations may be utilized, in which the transaction runtime may execute an application-specified function at the beginning of commit. This function may acquire locks, whose release may be deferred until the end of the commit operation, thus potentially significantly mitigating the critical section inflation problem. This can be useful in instances where threads typically update a tiny piece of common data in a tiny critical section (e.g., size field of a persistent collection such as a hash map).

In some embodiments, the programmer may have to ensure that critical section inflation does not lead to deadlocks or any other scalability issues. In some embodiments, it may be assumed that applications will use synchronization locks that are nonpersistent in nature.

Implementing Persistent Transactions

The techniques described herein may involve implementations of various transaction runtime systems, such as undo logging, redo logging, and/or copy-on-write (COW), according to different embodiments. In some embodiments, runtimes may store transaction metadata in a transaction descriptor or other persistent data structure assigned to a thread, such as part of beginning the transaction, as described regarding TXN_BEGIN above. In some embodiments, a descriptor may be in one of multiple states. For instance, in one embodiment a transaction descriptor may be in any of four different states, such as IDLE, RUNNING, ABORTED, or COMMITTED. A descriptor that is not in use may be in the IDLE state. TXN_BEGIN may transition the descriptor into the RUNNING state. A transaction may commit by entering the COMMITTED state and may abort by entering the ABORTED state. After the runtime cleans up a descriptor's internal state and buffers, the descriptor may return to the IDLE state. During its execution, a transaction may read, write, allocate, and deallocate persistent objects using an API, like the example API described above, according to some embodiments.

Persistent Memory Management with Lazy Persistence

Memory management may be considered a foundational tier in software stacks. Applications may use transactions to access persistent data and may routinely allocate and deallocate persistent objects within these transactions. The lazy persistence techniques described herein may be utilized with various transaction runtime implementations and may reduce and/or eliminate persist barriers for memory management. For instance, the techniques described herein may reduce the number of persist barriers per transaction to a constant number (e.g., 2) for undo logging and may eliminate persist barriers for memory management in redo logging and COW transactions, according to various embodiments.

Figure 2:
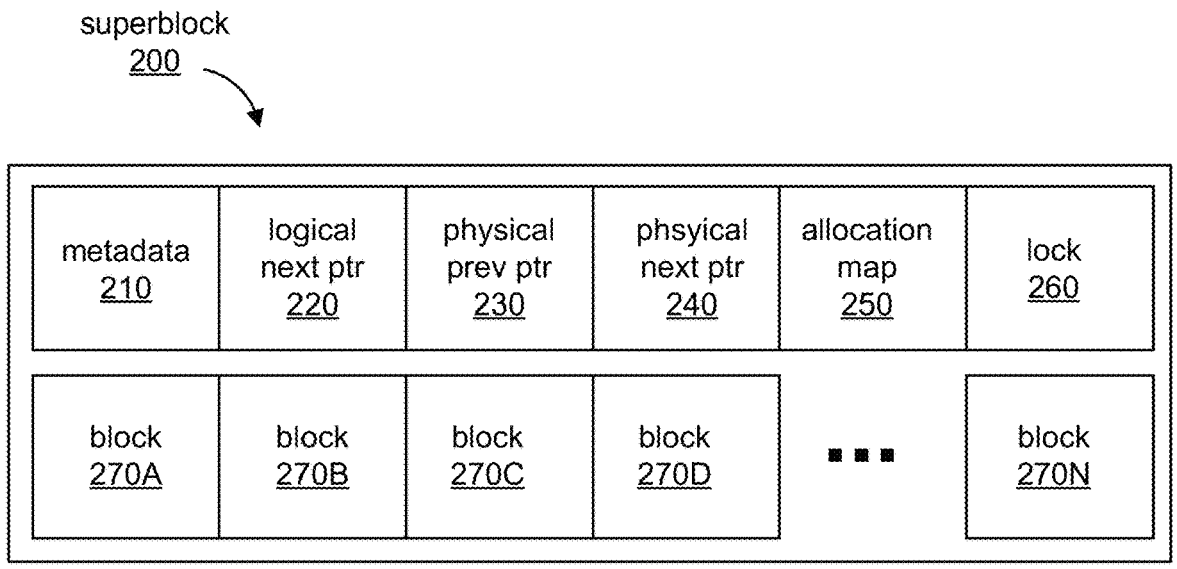
FIG. 2 is a logical block diagram illustrating a superblock and associated data, as per one embodiment.

In some embodiments, an allocator may be implemented where the heap is partitioned into shared and thread-private superblocks, with each superblock hosting blocks of a specific size. FIG. 2 is a logical block diagram illustrating a superblock and various associated information. Please note that FIG. 2 illustrates a superblock logically, but not necessarily represent the physical arrangement or location of the various data illustrated. Additionally, superblock 200 may represent any of various superblocks, such as a superblock in a globally shared heap or in a thread local heap, according to various embodiments.

Each superblock 200 may include various types of information. While in some embodiments, this information may be stored as part of, or together with, the blocks of the superblock, as illustrated by superblock 200, in other embodiments, the information illustrated within superblock 200 may be stored elsewhere but may correspond to superblock 200. In some embodiments, a superblock may include a logical next pointer 220, pointing to the next superblock in the current superblock list. Additionally, superblock 200 may include a physical previous pointer 230 and/or a physical next pointer 240 pointing to the superblocks that are physically (e.g., physical in memory) next (e.g., previous and next) to superblock 200.

In some embodiments, superblock 200 may also information indicating the allocated or free state of the corresponding blocks in the superblock. For example, allocation map 250 may represent a bitmap indicating the available/free state of each block within that superblock. Thus, allocation map 250 may indicate the available/free state of each of blocks 270A-N within superblock 200. For instance, in one embodiment, each block's state may be represented by a single bit in which a '1' indicates an allocated block and a '0' indicates a free block. According to various embodiments, allocation map 250 may be persistent while all other superblock metadata (e.g., such as free and/or used lists) may be nonpersistent (i.e., either actually or semantically) and may be hosted in DRAM. In some embodiments, a superblock's bitmap may be used to reconstruct free and used lists during recovery.

Additionally, in some embodiments, superblock 200 may also include metadata 210 including various other information used to allocate, maintain, use and/or deallocate superblock 200. For instance, a superblock's metadata may comprise a free list of blocks (e.g., blocks available for allocation) and a used list of blocks (e.g., already allocated blocks that are in use by the application) for that superblock. For example, superblock 200 may include within metadata 210, a list of the blocks 270A-N that are currently free and may also include a list of the blocks 270A-N that are currently allocated. In some embodiments, superblock 200 may be protected by a lock 270. Lock 270 may be persistent or nonpersistent, according to various embodiments.

The lazy persistence techniques described herein may separate an allocator's metadata in persistent and nonpersistent portions and the entire heap may be broken down into shared and thread private superblocks. Each superblock may host blocks of a specific size. For example, block sizes may vary from 32 bytes to 2 MB, while the superblock may be a fixed 4 MB in size, according to various embodiments. Larger allocations may be performed directly from the shared heap, which may also maintain a persistent list of allocated superblocks over the entire heap.

Globally Shared Heap of Superblocks

As noted above, allocation/deallocation of superblocks may incur two persist barriers while manipulating this persistent list of superblocks, but may be less frequent than regular allocation/deallocation (e.g., regular pm_alloc and pm_free) calls. The persistent list of allocated superblocks may represent the state of the shared heap. For instance, all contiguous memory address ranges not in the list of allocated superblocks may constitute the free space available in the shared heap. In some embodiments, this free space may be represented by a DRAM-resident nonpersistent free list.

Figure 3A:
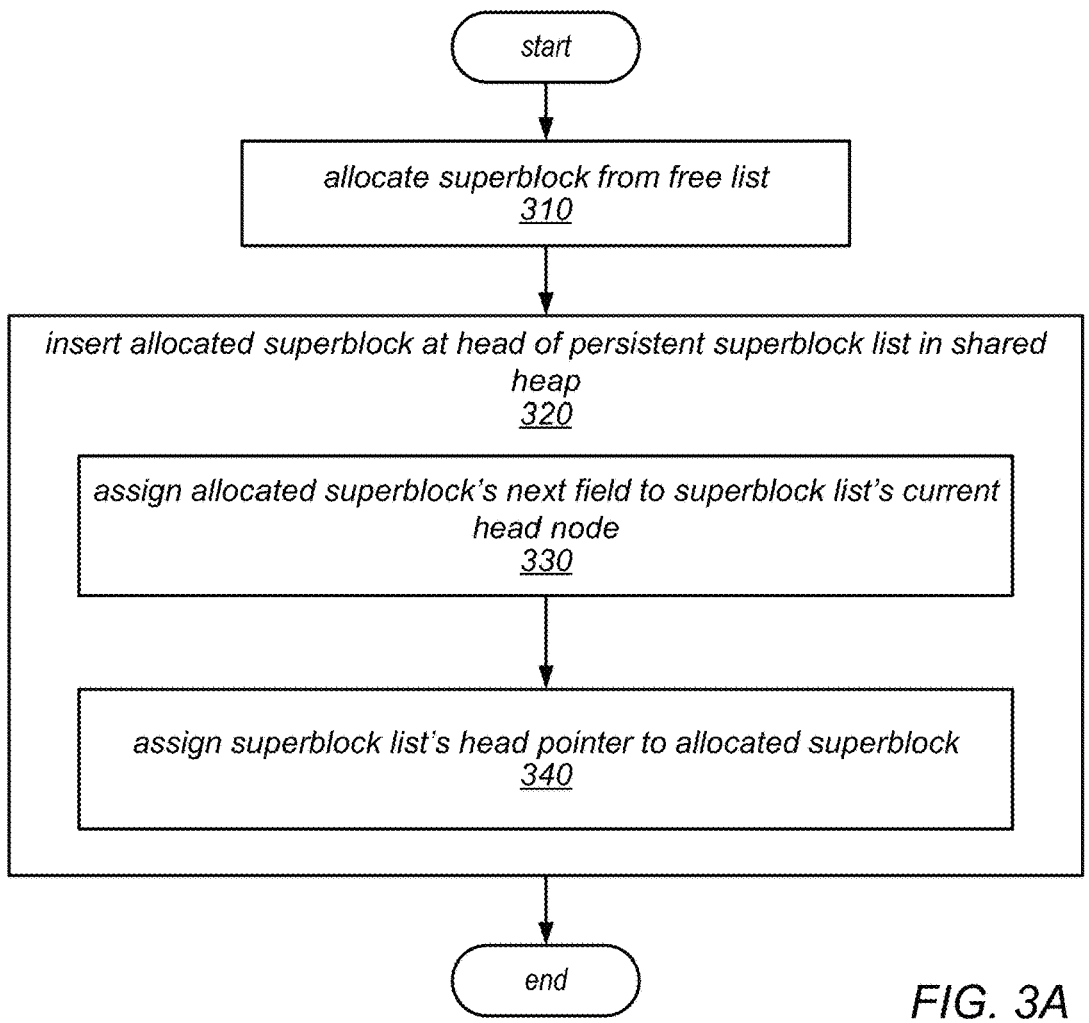
FIG. 3A is a flowchart illustrating one embodiment of a method for allocated a superblock, as described herein.

FIG. 3A is a flowchart illustrating one embodiment of a method for allocating a superblock, as described herein. As shown in block 310, a new superblock may be allocated from a free list, such as a DRAM-resident nonpersistent free list. For example, in one embodiment, a matching size may be looked up in all the contiguous address ranges (i.e., each represented by a single node in the free list), and once found, the superblock may be instantiated from the matching free memory address range. This superblock may then be inserted at the head of the persistent superblock list in the shared heap, as in block 320. For example, a superblock's next field may be assigned to point to the allocated superblock list's head node, as in block 330. In some embodiments, the assignment of a superblock's next field may be persisted using a persist barrier. The superblock list head pointer may then be changed to point to the new superblock and persisted, as in block 340.

Figure 3B:
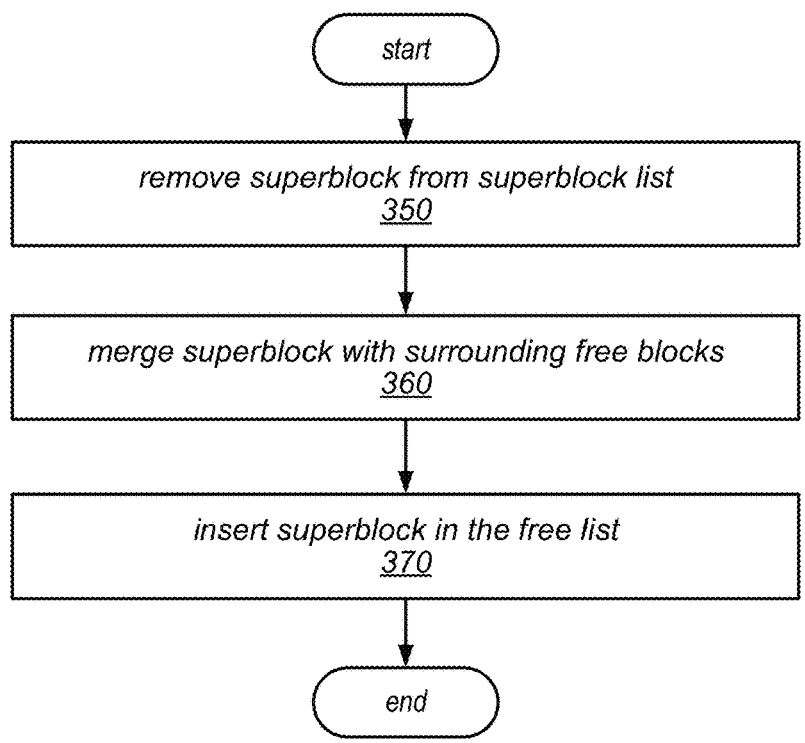
FIG. 3B is a flowchart illustrating one embodiment of a method for freeing a superblock, as described herein.

FIG. 3B is a flowchart illustrating one embodiment of a method for freeing a superblock, as described herein. Freeing up a superblock may involve removing the superblock node from the allocated superblock list, as in block 350. The superblock may then be merged with any immediately surrounding free blocks if any, as in block 360. The superblock may then be placed in a free list as in block 370. For example, in one embodiment a freed superblock may be placed in a free list for the shared heap. Additionally, in some embodiments a globally shared mutual exclusion lock may be utilized to protect these superblock management structures, such as to make them thread safe.

Thread-Local Heap of Superblocks

In addition to the globally shared heap, each thread may also maintain a private heap of superblocks. In some embodiments, a thread's private superblock heap may be a collection of superblock lists, where each list may include superblocks used to allocate/deallocate blocks of a specific size (e.g. 32 bytes, 48 bytes, 2 MBs, etc.). A thread may first attempt to perform its allocations from a local superblock (e.g., from its private superblock heap). If that is not possible (e.g., if all local superblocks for that block size are fully used), the thread may then request a new superblock from the global heap. Additionally, in one embodiment a pm_free call may be directed to the superblock enclosing the block being deallocated, irrespective of whether the superblock is local or global.

Lazy Persistence

While traditional implementations generally persist an allocator's modified state eagerly, such as right before the allocator's allocation/deallocation call returns, the techniques described herein may implement and/or utilize lazy persistence. For instance, in some embodiments the persisting of the effects of allocation/deallocation calls may be lazily performed and bundled with the enclosing transaction's commit operation related persist barriers. The lazy persistence techniques described herein may utilized with various system, such as with transaction runtimes that implement redo logging, undo logging and/or copy-on-write systems.

Superblocks and Allocation/Deallocation

When invoked from a transaction, an allocator, such as pm_alloc may not manipulate the persistent representation (bit) of the allocated block. Instead, in some embodiments a transaction may maintain a special allocation log including a list of all the allocation/deallocation calls made by the transaction in its lifetime. In other words, an allocation log may include information indicating instances of allocating and/or deallocating memory performed by, or within, the transaction. A transaction's allocation log may be hosted in persistent memory and may be populated and/or updated during allocation/deallocation calls (e.g., during pm_alloc and pm_free calls). Thus, in some embodiments, allocation and/or deallocation calls may append and/or write-back/flush allocation log records. No persist barriers may be used and/or required during allocation/deallocation calls. For instance, in one embodiment pm_alloc and pm_free calls may not require, and may not issue, any persist barriers. However, the nonpersistent state of the allocator may be manipulated during the allocator call. As noted above, in some embodiments a superblock's nonpersistent metadata may comprise a free list of blocks (e.g., blocks available for allocation) and a used list of blocks (e.g., already allocated blocks that are in use by the application) for that superblock.

Free and used lists may be implemented in various manners according to different embodiments. For example, in some embodiments, the free and used list may be implemented as singly linked lists. The allocation call (e.g., such as pm_alloc) may remove the head node from the superblock's nonpersistent free list and may add it to the head of the superblock's nonpersistent used list. Note that after a post failure/shutdown restart, the used/free lists of a superblock can be reconstructed from its persistent bitmap. If the application encounters a failure before the transaction commits, the entire allocation log can be completely ignored during recovery because the allocations' effects were not persisted in the heap's metadata, while the used/free lists may need to be reinitialized anyway.

If the matching superblock (e.g., the superblock for the transaction) does not include any blocks in its free list, an alternate superblock for the same block size in the thread-local heap may be queried. If all thread-local superblocks are full, a new superblock for the block size may be requested from the global shared heap. Once received, the thread stores this new superblock in its thread-local heap. In some embodiments, allocator threads may maintain their own local heaps that include lists of superblocks indexed by the size of the block allocations they support.

During deallocation calls (e.g., pm_free) the thread may not touch the deallocated block's enclosing superblock's nonpersistent used/free lists. Since the transaction may be considered semantically speculative in nature, its deallocation call effects must not become visible to other concurrent transactions before it commits. Thus, the deallocation call may simply append a free record in the enclosing transaction's allocation log.

In some embodiments, before a transaction commits, it may have to first persist its updates using a persist barrier. Since the persist barrier may be address oblivious (i.e., may not be address specific), this persist barrier may persist the allocation log as well. Once the transaction persists its COMMITTED state, the allocation log may be applied to the heap's corresponding metadata. For example, in one embodiment bits in corresponding superblocks' bitmaps may be flipped using compare-and-swap (CAS) instructions to avoid data races, and then the cache lines may be written back or flushed. The postcommit cleanup phase's first persist barrier may then persist these flipped bits. Then the transaction's state may be marked as IDLE, which may be persisted in the end. Note that a deallocation call's nonpersistent heap metadata may be updated after the last step.

As described above, in some embodiments cleanup persist barriers may be required in redo logging and COW. As a result, allocation may not add additional persist barriers. However, the cleanup persist barriers may not be required for undo log transactions. Additional (e.g., two) cleanup persist barriers may be introduced in undo log transactions. Thus, in some embodiments undo logging may entail more persist barriers than other implementation choices (e.g., such as redo logging). But, the advantage of uninstrumented reads may benefit undo logging transactions in significant ways. Additionally, the lookup optimizations in redo logs may make it competitive with undo logging.

In some embodiments, the techniques described herein may provide generality achieved by decoupling all allocation/deallocation effects from transactional writes into an independent allocation log. Furthermore, the allocation log may be persisted along with an enclosing transaction's updates when the transaction commits, and the resulting changes to the allocator's metadata (e.g., bitmaps in superblocks) may be persisted in the post-commit cleanup phase of the transaction. In some embodiments, the cleanup may introduce extra persist barriers per transaction to transaction runtime implementations that may not directly require persist barriers during a transaction's post-commit phase, such as in undo logging.

Note that an allocator's persistent state, such as may be embodied by the globally shared heap's allocated superblock list, per superblock metadata (e.g. pervious/next pointers to other superblocks, block size hosted by the super block, etc.) and the block allocation mapping of each superblock, may be implemented in various manners according to different embodiments.

Undo Log Based Transactions

Figure 4:
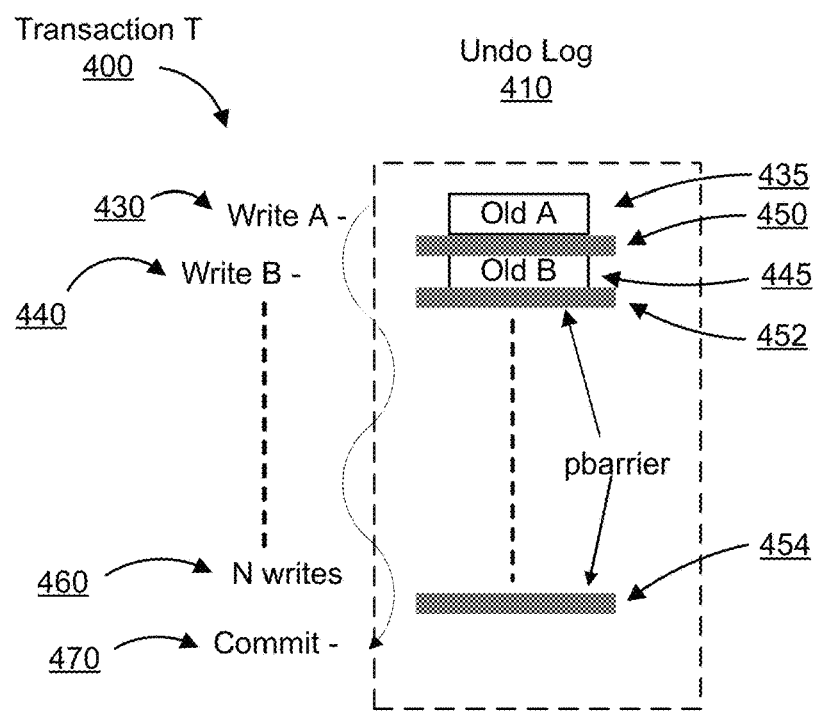
FIG. 4 is a logical block diagram illustrating persist barriers for undo logging with persistent memory transactions, according to one embodiment.

FIG. 4 shows a transaction's undo logging activities according to the techniques described herein. An undo log 410 may be implemented in some embodiments as a simple chunked list. For example, Transaction 400 may write A 430, such as by using TXN_WRITE, which may produce a log record 435 including the original value of A. Similarly, Transaction T may write B 440 producing log record 445 including the original value of B. In some embodiments, as per write ahead logging semantics, a log record may have to be persisted before the target is modified. A traditional implementation of the undo log append frequently require two persist barriers—one to persist the new log record and one to change the log's tail pointer. This approach may lead to 2N persist barriers for N appends, which may result in high overheads.

The techniques described herein may require only a single persist barrier per record. Instead of relying on a correct tail pointer during recovery, the tail of the log may be inferred. Thus, as illustrated in FIG. 4, when utilizing undo log 410 implemented according to the techniques described herein, Transaction T 400 may perform a single persist (e.g., 450) for each append, such as persist 450 for append 430 and persist 452 for append 440, resulting in an O(N) persist barriers for N appends.

Figure 5:
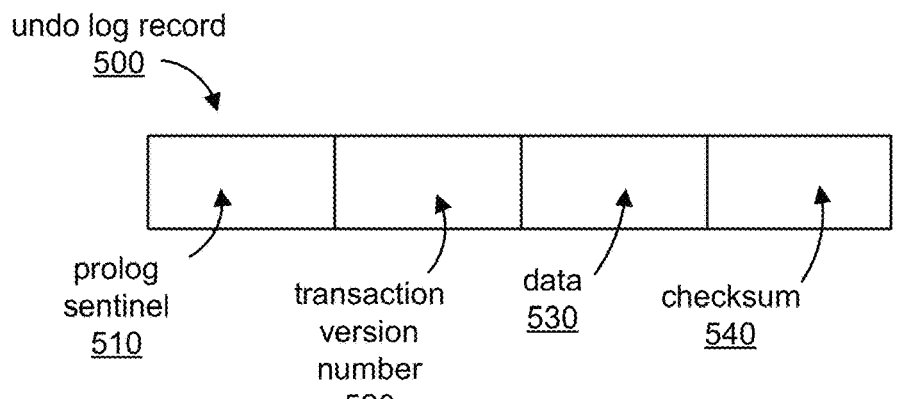
FIG. 5 is a logical block diagram illustrating an undo log record as described herein according to one embodiment.

FIG. 5 is logical block diagram illustrating an undo log record according to one embodiment. In some embodiments, each transaction may be assigned a monotonically increasing persistent version number, which may be unique to that transaction. Thus, each undo record may include a transaction version number, a checksum, and a prolog sentinel value (or other special value used to indicate the transaction's undo log record). The prolog sentinel value, the transaction's version number and the record contents may be written, and then the checksum may be computed and written, in some embodiments. Thus, as shown in FIG. 5, an undo log record 500 may including prolog sentinel 510, transaction version number 520, data 530 (e.g., the original value of data be updated by the transaction) and checksum 540. The exact size and nature of prolog sentinel 510, transaction version number 520, data 530 and checksum 540 may vary from embodiment to embodiment. For example, in some embodiments, the transaction version number, the prolog sentinel and the checksum may all be 64-bits in size. While in some embodiments, the transaction version number may be incremented when the transaction begins execution, in other embodiments, version numbers may be utilized in other ways. Checksum 540 may be computed using any of various algorithms and the particular checksum algorithm used may vary from embodiment to embodiment. Additionally, the formatting and ordering of prolog sentinel 510, transaction version number 520, data 530 and checksum 540 may vary from embodiment to embodiment. For instance, in one embodiment, the prolog sentinel may appear at the beginning of the undo record.

After the undo log record has been written, a single persist barrier may be issued, according to some embodiments. If a failure occurs before or during execution of the persist barrier, and only part of the undo record has been persisted, a checksum mismatch may be detected during recovery. The log tail pointer may also be maintained, but it may be updated after the persist barrier, so the tail update may be guaranteed to persist on or before the next record write and persist. In some embodiments, recovery may be able to rely on the following invariant: the tail pointer will be at most one record behind the actual end of log. Thus, log recovery may require the examination of the record after the current end of log to determine if there is a valid log record present. Upon recovery after a failure, if a valid undo log record is determined to be located after the end of the undo log (based on the tail pointer) the tail pointer may be updated to point to the correct end of the undo log. The ability to implement transactional reads as uninstrumented loads may be considered a compelling benefit of undo logging.

Figure 6:
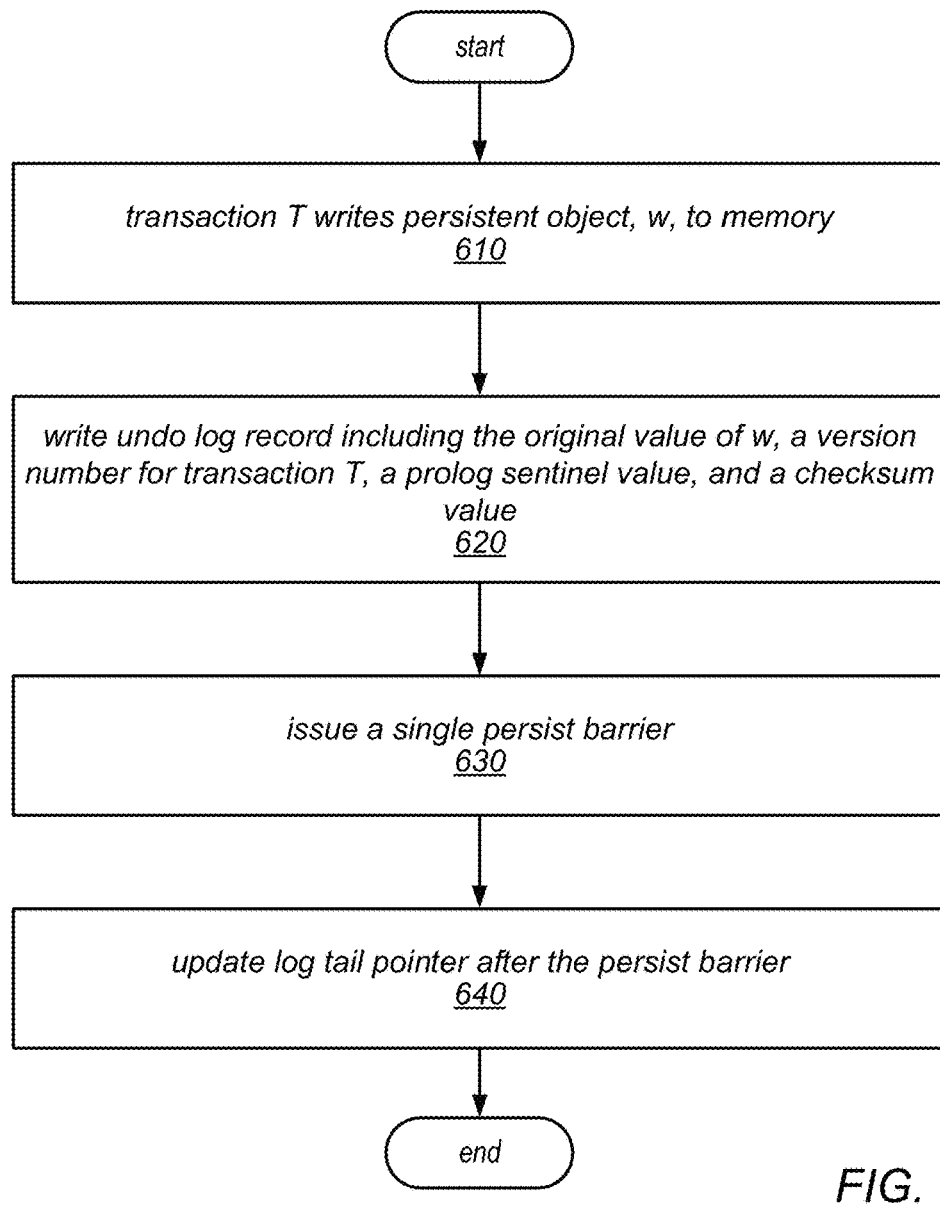
FIG. 6 is a flowchart illustrating one embodiment of a method for undo logging with persistent memory transactions.

FIG. 6 is a flowchart illustrating one embodiment of a method for undo logging with persistent memory transactions, as described above. For example, according to one embodiment, a transaction T may write a persistent object to memory, such as by using TXN_WRITE as in block 610. An undo log record including the original value of the persistent object, a version number for the transaction, a prolog sentinel value and a checksum value may be written, as in block 620. For instance, as described above, prolog sentinel 510, transaction version number 520, data 530 and checksum 540 may be written to undo log record 500.

After the undo log record is written, a single persist barrier may be issued, as in block 630. As illustrated in block 640 the log tail pointer may be updated after the persist barrier. Since the tail pointer may be updated after the persist barrier, the tail update may be guaranteed to persist on or before the next record write and persist, according to some embodiments. Thus, the persist barrier issued in block 630 may persist a previous update to the tail pointer.

Figure 7:
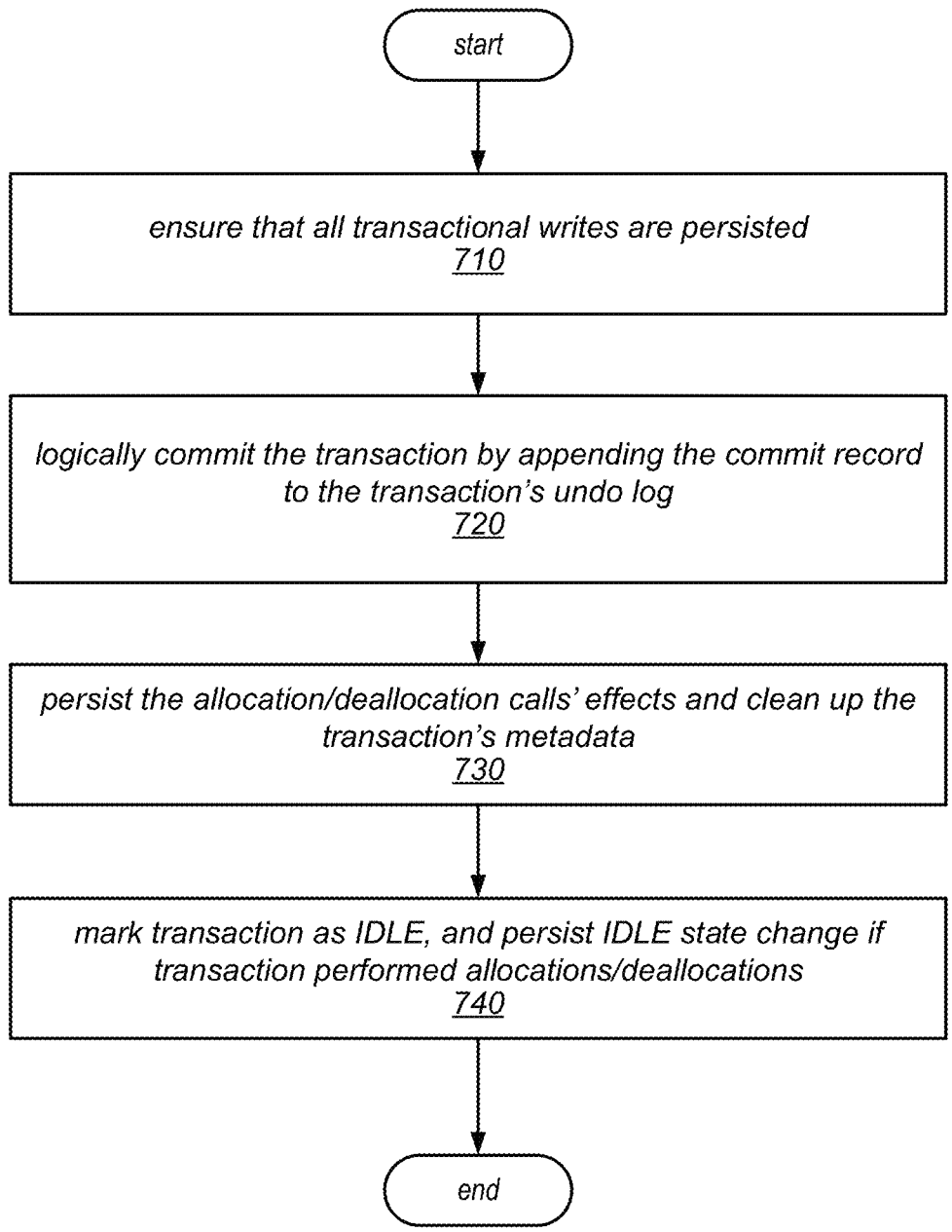
FIG. 7 is a flowchart illustrating one embodiment of a method for committing a transaction with undo logging with persistent memory transactions.

FIG. 7 is a flowchart illustrating one embodiment of a method for committing a transaction with undo logging with persistent memory transactions, as described above. An undo log transaction may, in some embodiments, commit in four steps. First it may ensure that all transactional writes are persisted as shown in block 710, which may require a single persist barrier Then it may logically commit the transaction, such as by appending the commit record to the transaction's undo log as in block 720. Additionally, the transaction's state may be switched to COMMITTED, but that may not have to persist, according to some embodiments.

As in block 730, the transaction may persist the allocation/deallocation calls' effects and clean up the transaction's metadata. Additionally, the transaction may be marked as IDLE as in block 740. Changing the transaction's state to IDLE may need to be persisted if the transaction performed allocations/deallocations. Additionally, in some embodiments, a transaction's state may need to be persisted only if the transaction performed at least one allocation/deallocation. Thus blocks 730 and 740 may be largely related to transactional metadata cleanup, which may require persistence only if the transaction allocated or deallocated persistent memory.

Redo Log Based Transactions

Figure 8:
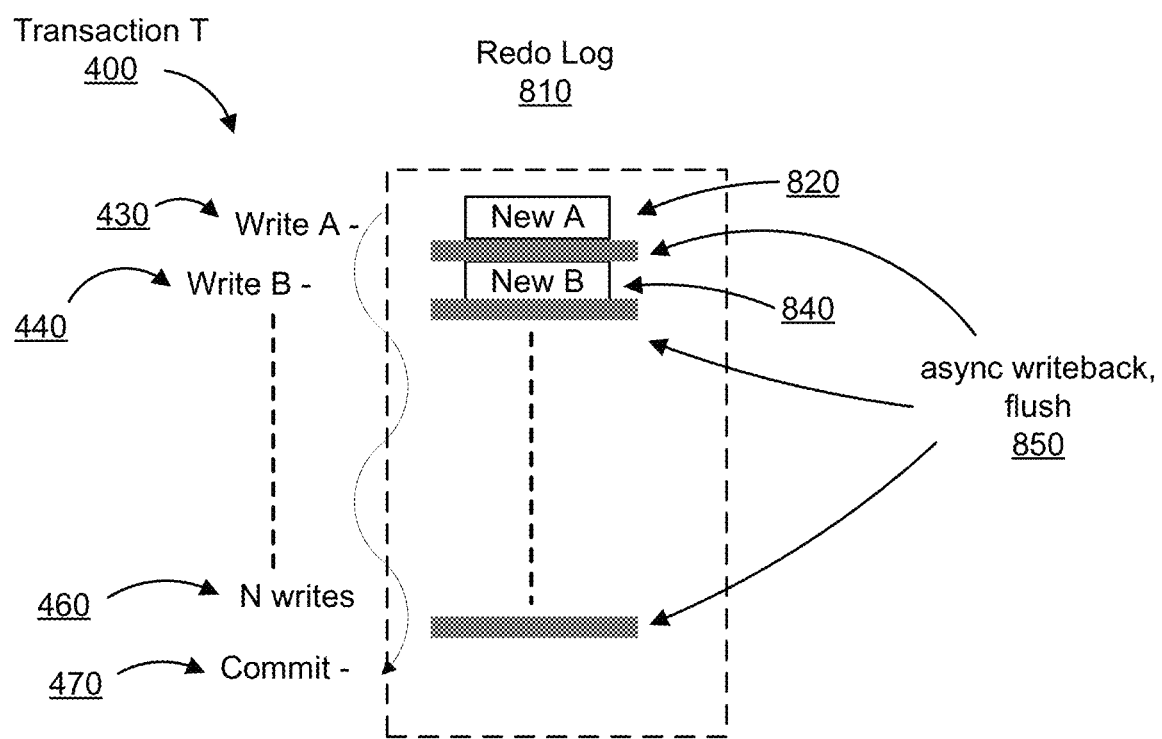
FIG. 8 is a logical block diagram illustrating redo logging with persistent memory transactions, according to one embodiment.

FIG. 8 is a logical block diagram illustrating a transaction's redo logging activities, according to some embodiments. Like an undo log, in some embodiments a redo log may be implemented as a simple chunked list. Transaction T 400 may write A 430, such as by using TXN_WRITE, thereby producing a log record 820 including the new value of A in redo log 810. Similarly, Transaction T may write B 440 producing log record 840 including the new value of B. In some embodiments, the record need not persist at the time of the write. If a failure occurs, the entire redo log may be discarded. However, in some embodiments, asynchronous writeback/flush 850 of the record may by proactively scheduled. In some embodiments, asynchronous writeback/flushes may be (or may be considered) low latency instructions.

One challenge for redo logging schemes may be handling read-after-write access patterns, in some embodiments. As a new value appears only in the redo log, extra steps may be required to ensure that subsequent reads find the new value in the log. A naive implementation might scan the log looking for the target address, possibly resulting in high overhead for reads, which are frequently more common than writes in workloads. Furthermore, the high overhead lookup may happen for every subsequent read by the transaction, possibly leading to much higher overheads. Two optimizations to overcome these overheads are described herein according to various embodiments.

Figure 9:
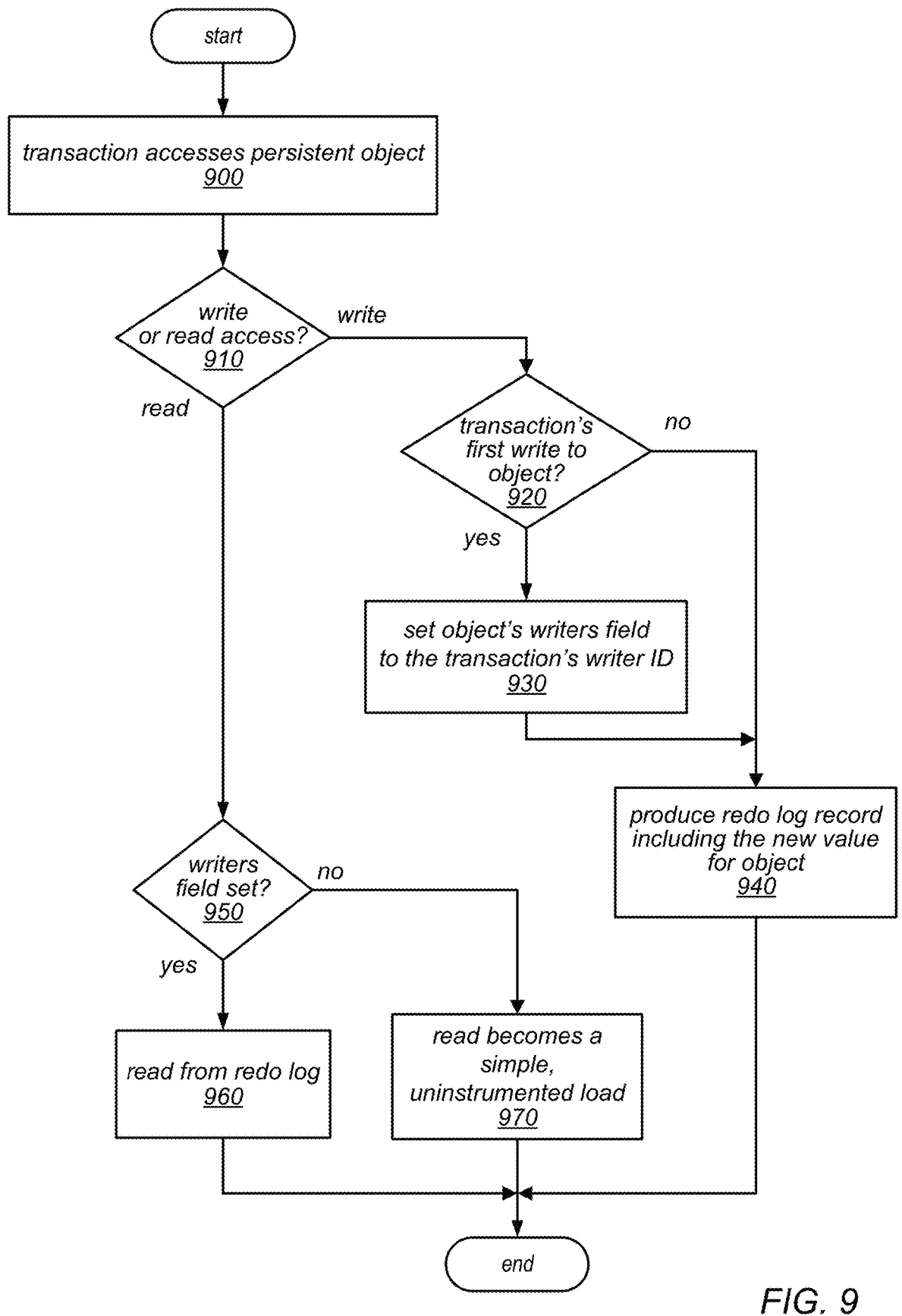
FIG. 9 is a flowchart illustrating one embodiment of a method for implementing redo logging utilizing a writers field, as described herein.

First, a bitmap field, called writers, may be added in persistent type instance metadata. In some embodiments, this may be done automatically via the DEFINE_PM_TYPE, or similar, declaration. Active transactions may be assigned a writer ID, such as a small, integer-valued writer ID in some embodiments. In other embodiments, however, other types, formats and/or sizes of writer IDs may be used. FIG. 9 is a flowchart illustrating one embodiment of a method for implementing a redo log utilizing a writers field, as described herein. When a transaction accesses a persistent object, as in block 900, if the access is a write, as indicated by the write output of decision block 910, it may be determined whether the write is the transaction's first write to the object as in decision block 920. When a transaction issues its first write to a persistent object, as indicated by the positive output of decision block 920, the runtime may atomically set the writers field corresponding to the transaction's writer ID, as in block 930. In some embodiments, the writers field may be stored, or maintained, in the persistent object's header. The transaction and/or runtime may then proceed to produce a redo log record including the new value (i.e., written by the transaction) for the object, as in block 940.

On a transactional read, as indicated by the read output of decision block 910, the runtime may determine whether the writers field is set, as in decision block 950. If corresponding writers field is set, as indicated by the positive output of decision block 950, the runtime may consult the log to read the value of the object, as in block 960. Thus, if a transaction had previously written to the object, the runtime may subsequently read the value of the object from the redo log, thereby obtaining the most current value for the persistent object. If the corresponding writers field is not set, as indicated by the negative output of decision block 950, the read may then become a simple, uninstrumented load, as in block 970. Although described herein regarding 64-bit writers, the size of the bitmap may vary from embodiment to embodiment.

Figure 10:
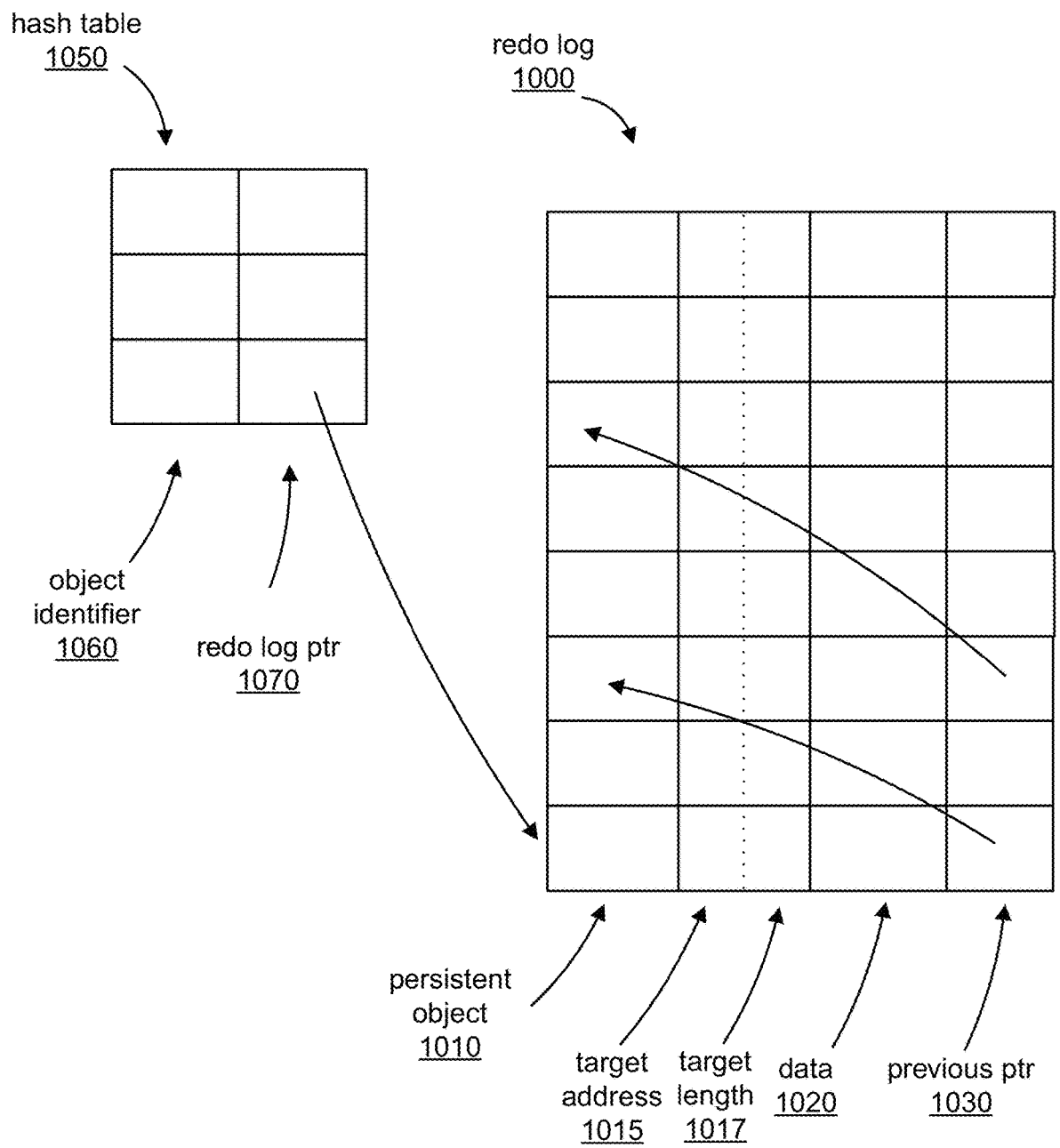
FIG. 10 is a logical block diagram illustrating a per-transaction hash table, according to one embodiments.

Additionally, scanning the entire redo log may be avoided in some embodiment by maintaining a per-transaction hash table, keyed by information identifying a persistent object, such as a persistent object's base address in some embodiments. Note that although the redo log may be persistent, this lookup structure may not have to be persistent. Thus, in some embodiments, the hash table lookup structure may be placed in DRAM. FIG. 10 is a logical block diagram illustrating a per-transaction hash table, according to one embodiments. All objects written by the corresponding transaction may appear in the hash table 1050. As noted above, hash table entries may include information identifying a persistent object 1060, such as the persistent object's base address. Additionally, hash table entries may include a redo log pointer 1070 to the most recent redo record (or in some embodiments a value equal to such a pointer). The redo record in redo log 1000 may include the persistent object 1010, a target address 1015, a target length 1020, data field 1020 (e.g., representing the new value for the object), as well as a previous pointer 1030 to the previous redo record for the same object in the same redo log. Thus, multiple linked lists may be superimposed, such as one per persistent object modified by the transaction, on top of a single redo log, according to some embodiments. These per-object lists may be looked up during read-after-write scenarios.

The writers field may be semantically nonpersistent. Thus, in some embodiments it may be used only to determine if transactional reads need to consult the hash table. A writers field may be used to track the current writer transactions of that object (e.g., the transactions that write to the object). However, since the writers field may be a part of a persistent wrapper object, its contents may persist, which could lead to a transaction incorrectly assuming that it has written an object that it is reading, such as after a post-failure restart. While this may be a performance problem rather than a correctness one, it may be significant in some case. This may be avoided, in some embodiments, by attaching a generation number to the writers field. In some embodiments, the persistent region may also include a persistent generation number that may be incremented (and may be persisted) every time the region is mapped by an application. As a part of updating the writers field during its first write to the enclosing object, as described above regarding block 930 of FIG. 9, a transaction may also check the corresponding generation number, and may reset the writers contents if the generation is older than the region's current generation number and also updates the object's generation number with the region's current one.

Figure 11:
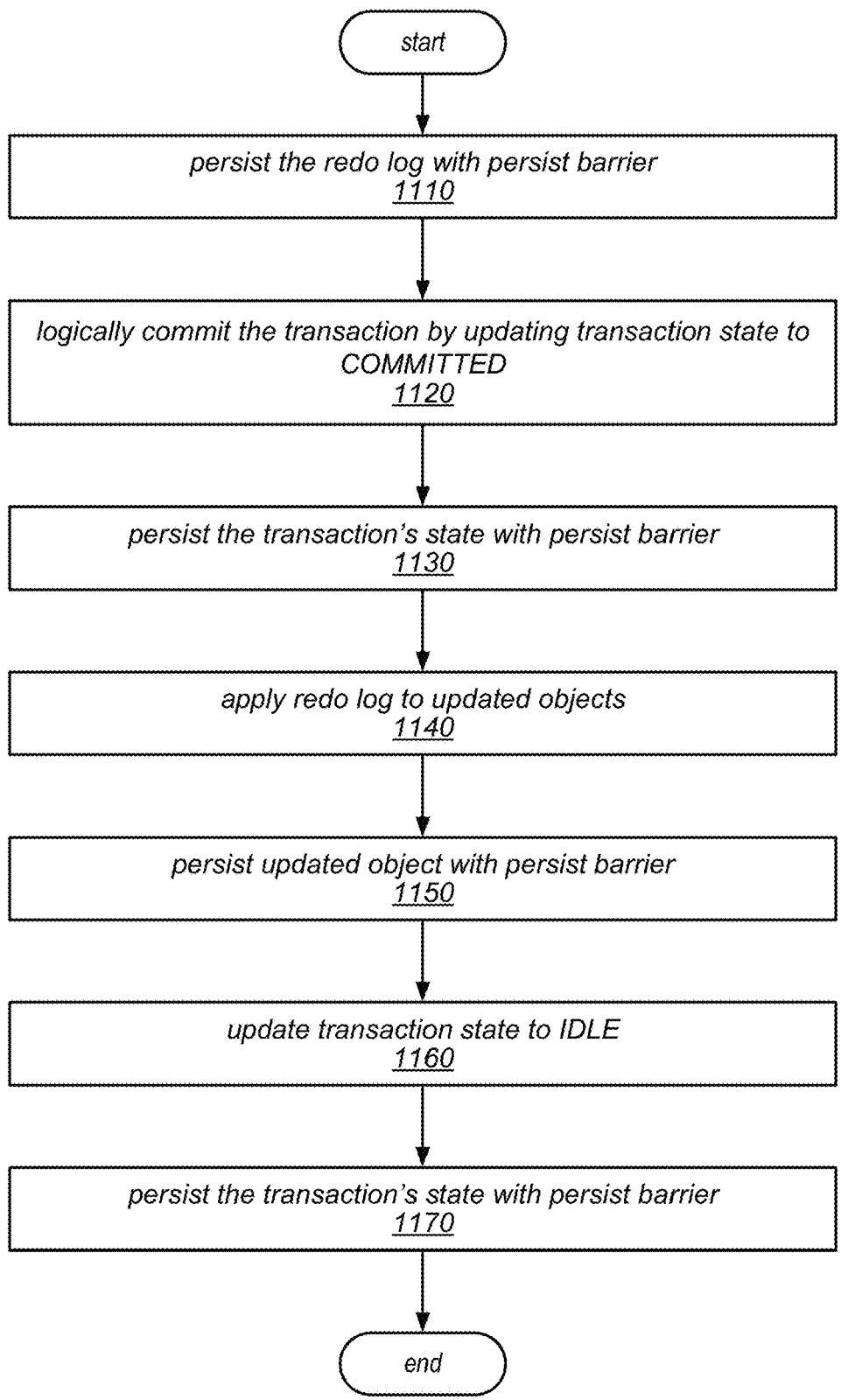
FIG. 11 is a flowchart illustrating one embodiment of committing a transaction when utilizing a redo log, as described herein.

In some embodiments, committing a transaction may require persisting the redo log. FIG. 11 is a flowchart illustrating one embodiment of committing a transaction when utilizing a redo log, as described herein. First, the redo log may be persisted with a persist barrier, as in block 1110. After the persist completes, the transaction may logically commit by updating its state to COMMITTED, as in block 1120, and may then persist the new state with a second persist barrier, as in block 1130. After the logical commit, the runtime may apply the redo log to each modified object, as in block 1140, and may then issue a third persist barrier to persist those changes as in block 1150. Finally, transaction may be marked IDLE, as in block 1160, and the transaction's IDLE state may be persisted as in block 1170. Thus, in some embodiments, the redo logging implementation may require four persist barriers for commit, but may not require any persist barriers on abort. After completing the commit or abort, in some embodiments transaction processing may be completed by clearing the appropriate bit in the writers field of every modified object.

Copy-On-Write Based Transactions

Figure 12:
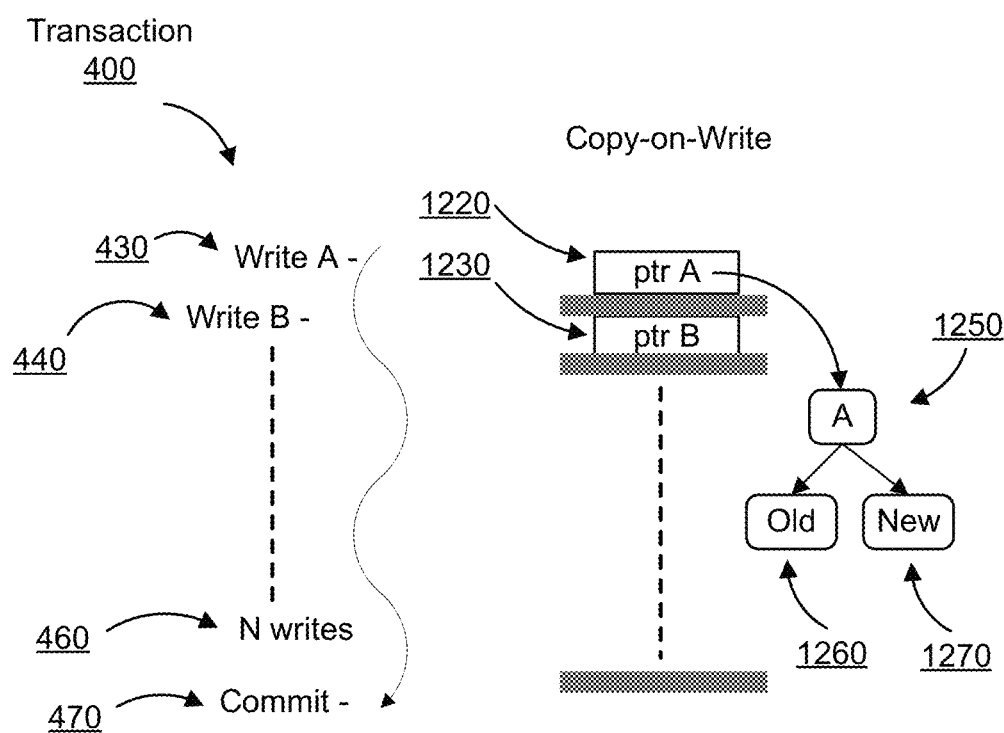
FIG. 12 is a logical block diagram illustrating copy-on-write with persistent memory transactions, according to one embodiment.

According to some embodiments, a copy-on-write (COW) implementation may introduce an extra level of indirection between a persistent type instance (the wrapper) and the real data type (payload) it encloses. As shown in FIG. 12, a persistent type instance 1250 may include pointers to old 1260 and new 1270 versions of the enclosed type's instances. Before modifying an object, a transaction 400 may create a new copy 1270 of the payload. While not illustrated in FIG. 12, ptr B 1230 may also include pointers to a corresponding persistent type instance as well as new and old versions of B's payload. The copy operation itself may vary with the structure of the payload and from embodiment to embodiment. For instance, if the payload is a linked structure, the copy operation may require a "deep copy". If the object includes "self-relative" pointers, a simple memcpy may not work correctly. As a result, in some embodiments applications may, or may need to, provide "copy constructors" for the copy-on-write implementation. For instance, in some embodiments, a special TXN_OPEN API may be provided usable by applications to obtain read-only or read-write access to a persistent object, such as in the following example:

TXN_OPEN(txn, obj, mode, copy_ctor);

where mode may indicate either read-only or read-write, and copy_ctor is an application supplied copy constructor. In some embodiments, a NULL copy constructor may default to using memcpy.

Each transaction may maintain (such as in the transaction descriptor) a write set including the list of objects the transaction has written. For instance, in some embodiments, objects may be added to the write set in TXN_OPEN invocations with read-write mode. Object wrappers may also include the writing transaction's ID (e.g., assuming at most one writer per persistent object), which may be used to direct transactional reads to appropriate payload copy according to some embodiments.

In some embodiments, payload copies as well as writes to their wrappers may not be persisted during the writer transaction's execution. The writer's write set and the objects it writes may be persisted using a single persist barrier at the beginning of the commit operation and the runtime may update the transaction's state to COMMITTED and persist it, according to some embodiments.

Figure 13:
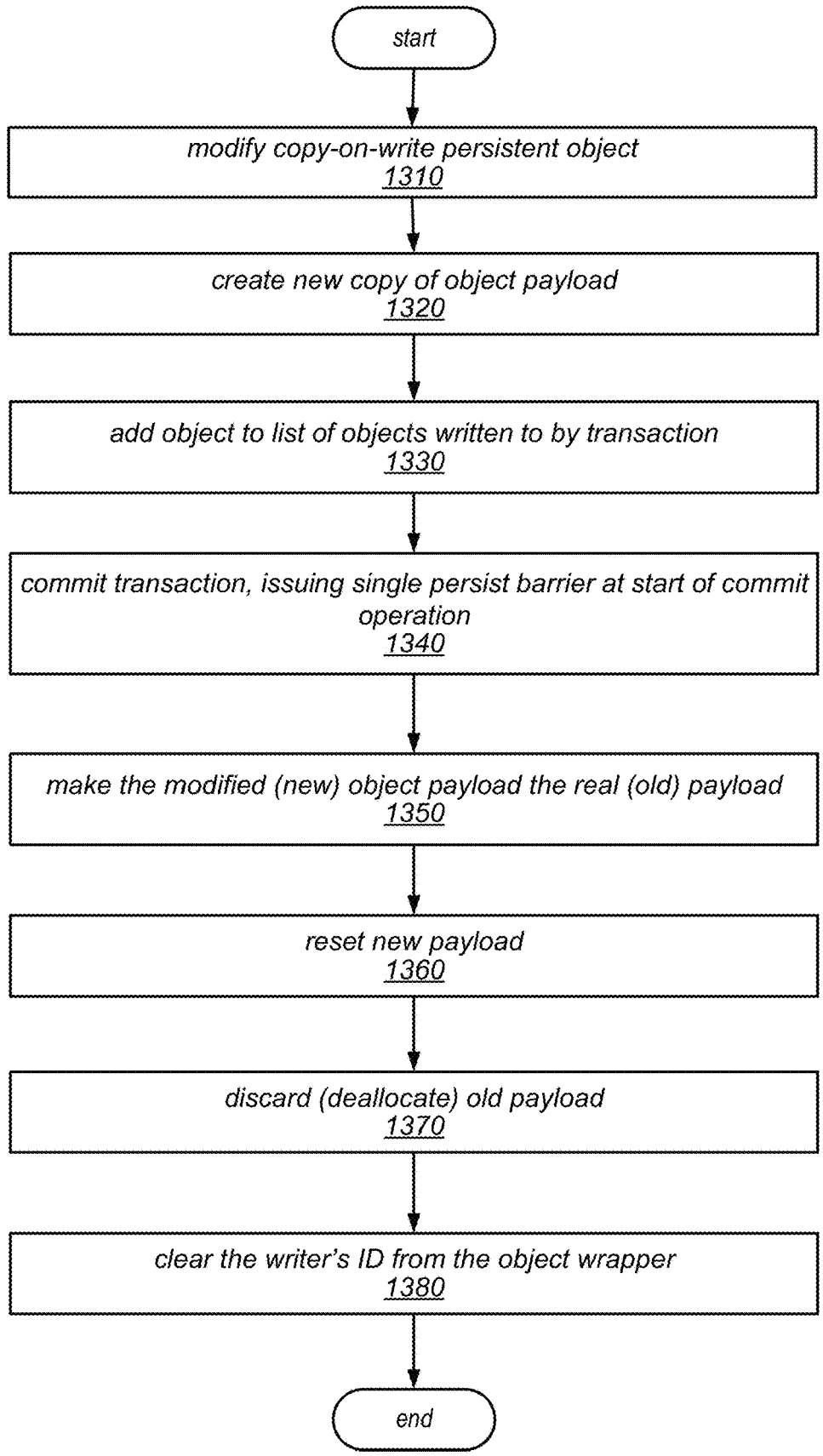
FIG. 13 is a flowchart illustrating one embodiment of a method for a persistent memory transaction with copy-on-write.

FIG. 13 is a flowchart illustrating one embodiment of a method for a persistent memory transaction with copy-on-write, as described above. For instance, as shown in block 1310, a transaction may modify a copy-on-write persistent object and may create a new copy of the object payload, as in block 1320. For example, transaction 400 may modify object A 1250 and may create a new copy 1270 of the object. The modified object may be added to a list of objects written to by the transaction as in block 1330. For instance, ptr A 1220 referencing object A 1250 may be added to the transaction's object list. Additionally, the transaction may be committed, such as by issuing a single persist barrier at the start of the commit operation, as illustrated in block 1340.

In some embodiments, the post-commit cleanup may utilize four steps. For example, the modified (new) object payload may be made into the real (old) payload, as in block 1350. For instance, the new version 1270 of object A 1250 may be moved (or copied) to be the old version 1260. Additionally, the new payload may be reset, as in block 1360, such as by setting a pointer to the new version to NULL. For example, a pointer from object A 1250 to new payload may be set of NULL. The old payload may be discarded (e.g., deallocated), as in block 1370 and the writer's ID from the wrapper may be cleared, as in block 1280.

In some embodiments, this process may be susceptible to memory leaks. For instance, a failure between steps modifying the new object payload and discarding the old payload may result in the reference to the old payload being lost. This leak may be avoided in some embodiments by adding an old_backup field in the wrapper set to point to the old payload (such as in TXN_OPEN).

When utilizing copy-on-write, the transaction commit process may be similar to the redo log commit process. However, the old_backup field may be persisted during the first persist barrier in the commit operation. Thus, the old_backup field may be used to deallocate the old payload. Next, the transaction's allocations/deallocations may all be persisted. The third persist barrier may be issued after all this cleanup. Then, the transaction may update its state to IDLE and persist it using a fourth persist barrier, as described above regarding redo logging. In some embodiments, this may ensure that no further cleanup is needed. Finally, the transaction's ID may be cleared from all the objects to which it wrote. If a transaction aborts, only the last two clean up related persist barriers may be needed for correct rollback in the presence of failures, according to some embodiments.

Qualitative Analysis

Note that the methods, techniques and APIs are described herein using an object-oriented example. While in some embodiments, undo logging may not need such an interface, in other embodiments redo logging may leverage an object-oriented interface to avoid read-after-write lookups, as described above. However, redo logging may be implemented without an object-oriented interface as well. For example, a lookup hash map may still be used, but it may be indexed by page granular addresses. This may enable bypass of the object based dependency, such as by letting applications pass a NULL pointer as a persistent object's address, according to some embodiments. Thus, while described herein using object-oriented examples, in other embodiments, the methods, techniques and APIs described herein may be implemented and/or used with programming languages, methodologies and/or styles that are not object-oriented.

While the methods, mechanisms and/or techniques described herein may utilize aliasing persistent objects in DRAM, maintaining aliases may lead to greater cache pressure in some embodiments. For example, the runtime may have to access one more copy of each object accessed by the transaction. Furthermore, if an application exhibits good cache locality, direct accesses of persistent objects may find them in processor caches, making them more efficient than lookups in the alias cache. Additionally, in some embodiments, aliasing may not be used or may be unnecessary.

Empirical Evaluation

In order to evaluate the methods, techniques and/or mechanisms described herein, several microbenchmarks were developed using the transactional interface described herein. Additionally, for evaluation purposes, a persistent key-value store was built, parts of SQLite were modified to use transactions to persist the database, and memcached was modified to be effectively persistent. These microbenchmark experiments provide insight into performance tradeoffs between the various implementation choices, while the data intensive applications reflect those findings into a "real world" setting.

Experiments were executed according to particular example embodiments. Please note that the embodiments utilized to evaluate the methods, techniques and/or mechanisms described here represent particular examples and do not represent the full range of embodiments for which the methods, techniques and/or mechanisms described here may be utilized. According to one example embodiment, evaluation experiments were conducted using Intel's Software Emulation Platform. This emulator hosts a dual socket 16-core Intel Xeon Processor E5-4620 v2, with 512 GB of DRAM. 384 GB of that DRAM is configured as persistent memory and 128 GB acts as regular memory. Persistent memory is accessible to applications via mmapping files hosted in the PMFS instance installed in the emulator. The emulator supports the clflush-opt and pcommit instructions. The load latency of persistent memory may be a configurable parameter within these evaluation experiments. Given that persistent memory may be expected to be slower than DRAM (e.g., in the near future), a load latency of 300 nanoseconds was utilized in these experiments. Additionally, a store latency in the emulator may be utilized equal to a DRAM store latency. The evaluation implementation did not use clflush-opt since it is implemented by the emulator using the synchronous clflush instruction. Instead, clflush-opt may be utilized as a nop in these evaluation implementations. The pcommit instruction sequence latency may also be configurable. For example, in the evaluation implementations the latency may be set to 500 nanoseconds.

To simulate persistence domains, the persist barrier primitive (called pm_persist_barrier herein) may be implemented using the pcommit sequence (for PDOM-0), a 100 nanosecond idle spin loop (for PDOM-1), and a nop (for PDOM-2). Note that experiments may be conducted over a wider range of load and persist barrier latencies: (i) load latency of 165 (DRAM load latency) to 300 nanoseconds, and (ii) persist barrier latency ranging from 0 to 1000 nanoseconds, according to various example embodiments.

Microbenchmark Evaluation

Example evaluation microbenchmarks may comprise commonly occurring data structures in applications: stack, queue, sorted_list, binary search tree (bst), and two variants of an array microbenchmark (array_memcpy and array_incr). The first three example evaluation microbenchmarks run transactions that, with equal probability, perform a single insertion or deletion. The sorted list is restricted to a maximum size of 512 nodes. In bst (includes up to 10 million nodes), lookups, puts, and removes are performed with different distributions. The array microbenchmarks are borrowed from the SoftWrAP work. Both include a 2-dimensional persistent array of 64-bit integers. A transaction randomly picks a set of slots and increments all integers in each of the picked slot. Each slot itself is implemented as a persistent object. Array_memcpy does the increments for each slot by first copying the slot's integers in a temporary buffer in DRAM, incrementing the copied integers, and then copies the new values back to the array slot. array_incr increments each integer individually in the persistent slot. While both variants are write-intensive, the former captures behavior of workloads that update an object in "one shot", while the latter depicts workloads where objects are read and updated incrementally in a transaction. Slot sizes ranging from 8 bytes (1 integer) to 4 KB (512 integers), and varied the number of slots updated from 1 to 64 may be utilized according to various embodiments.

Results of various example evaluation embodiments are reported herein as the median of three 10-second test runs preceded by a 10-second warmup.

Transaction Latency

Results are described herein for a single persist barrier undo log implementation, according to one example embodiment. Over the straightforward undo log implementation that employs 2 persist barriers per append, this example optimization may produce a 30-40% latency improvement in PDOM-0, a 10-20% latency improvement in PDOM-1, and has no effect in PDOM-2.

Figure 14:
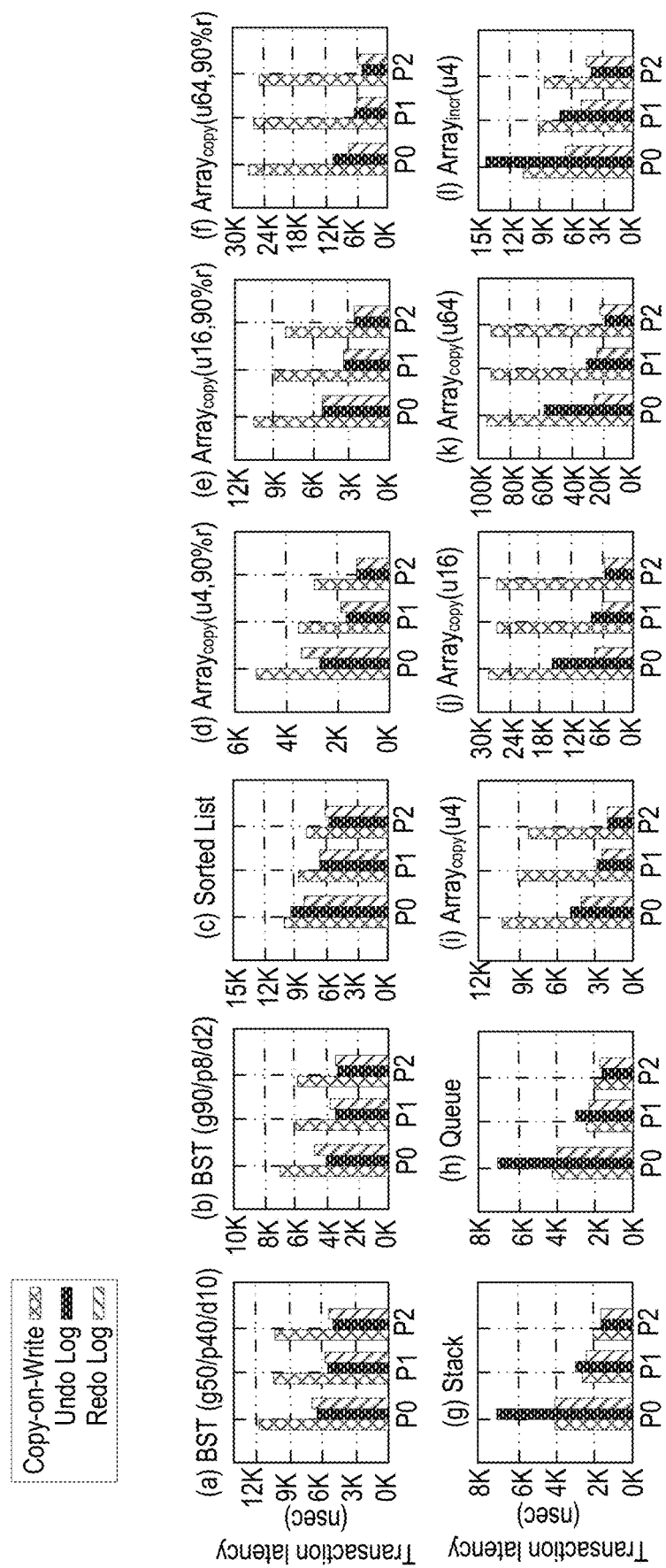
FIG. 14 illustrates per-transaction latency for read-dominated and write-dominated micro-benchmarks, according to one embodiment.

FIG. 14 shows the per-transaction latency for all microbenchmarks—FIGS. 14A-14F show read-dominated microbenchmarks while FIGS. 14G-14L illustrate write-dominated microbenchmarks, as run under different persistence domain settings. In bst charts, gXX/pXX/dXX % stands for get, put and delete distributions. In the array charts, uX stands for the number of slots accessed/updated by transactions; 90% reads represent test runs, where 90% of the transactions were read only. Beginning with the read-dominated tests, the following result may be observed: (i) COW transactions may be the slowest. COW's performance may be hindered by two problems. First, according to example embodiments, the extra level of indirection may lead to more cache misses. Second, writes may tend to allocate and populate new versions of objects, possibly leading to even more cache pressure and memory management overhead. COW transactions may typically lead to 40-100% more cache misses than undo and redo logging transactions. (ii) Undo may have a slight (10-15%) performance advantage over redo logging according to example embodiments, possibly because transactional reads for undo logging may be uninstrumented loads, whereas the ones in redo logging incur overhead ranging from a fast metadata check to a somewhat slower hash lookup. It is important to note that the performance advantage of undo logging for read-dominated microbenchmarks vanishes without a single-persist barrier optimization. In fact, the unoptimized undo logging implementation underperforms redo logging by 10-40% (numbers not shown here). Redo logging dominates undo logging only in microbenchmarks with many writes—array_memcpy (u64), which updates 64 slots, and inserts/deletes in sorted_list in which all writes, even the ones related to object initialization, are transactional. As undo logging requires a number of persist barriers proportional to the number of writes, as the sheer number of writes increases, so does the overhead.

For write-dominated workloads, FIGS. 14G-14L, undo logging maintains its slight performance edge over redo logging in the PDOM-2 setting, where there is no persist barrier penalty. However, in PDOM-1 and PDOM-0, redo logging is as good as or better than the alternatives. This is unsurprising, given the linear number of persist barriers required by undo logging and the cache effects in COW.

Memory Allocation Performance

Figure 15:
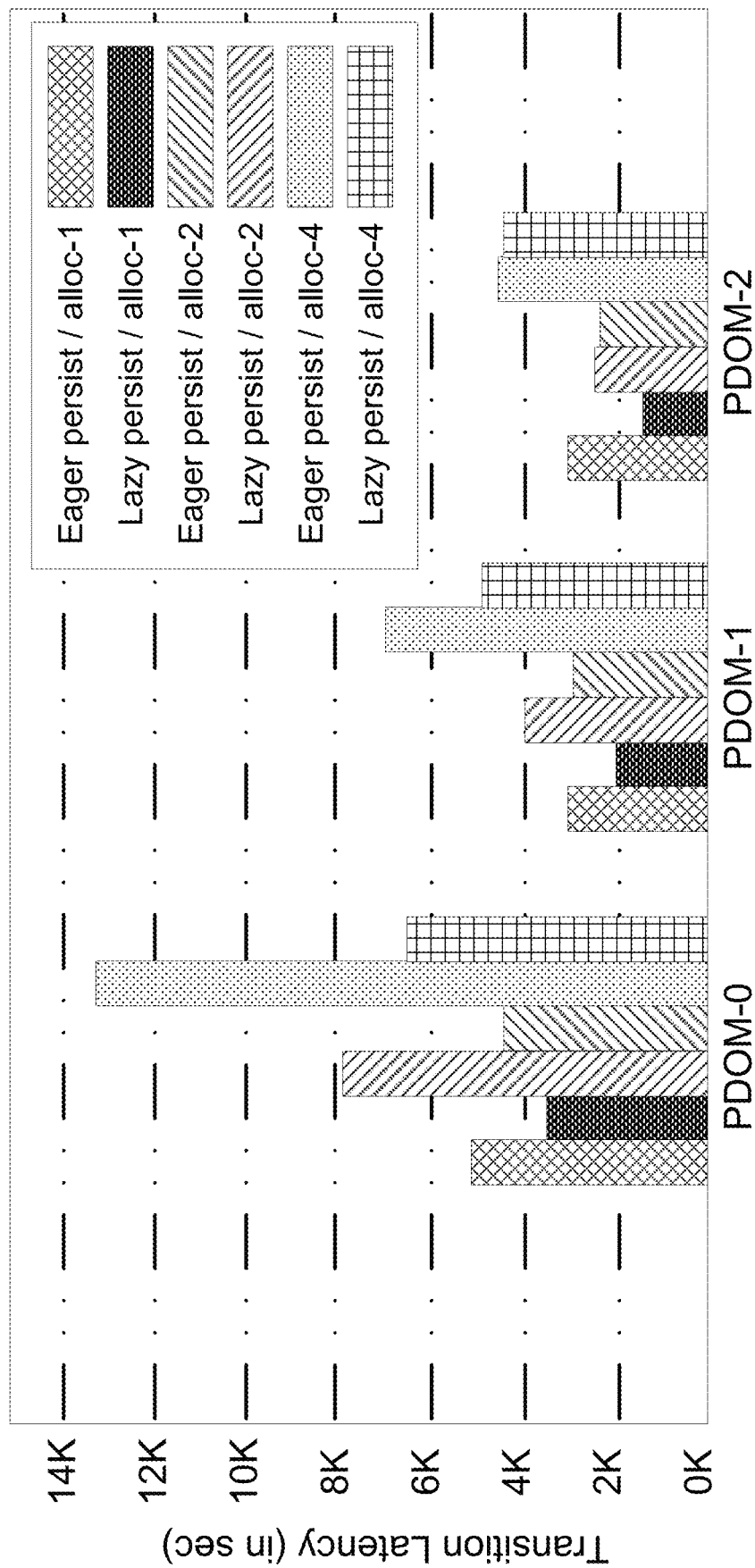
FIG. 15 illustrates memory allocation latency for the mechanisms described herein compared to traditional techniques, according to one embodiment.

FIG. 15 shows memory allocation latency, comparing an Eager Persist approach that uses, according to the example embodiment, persist barriers per allocation/deallocation call, to the lazy persist approach that may avoid persist barriers altogether during allocation/deallocation calls, as described herein. As illustrated in FIG. 15, there may be no performance difference in PDOM-2 (e.g., because the persist barrier may be a nop). However, for PDOM-1, the lazy persistence techniques described produced a 20-30% latency improvement, according to the example evaluation embodiment. In PDOM-0, the improvement increases to 30-100%, such as because the persist latency may be higher, according to the example embodiment.

DRAM-Based Aliasing

Persistent memory technologies may be slower (higher latency, lower bandwidth) than DRAM. In some example evaluation embodiments, a DRAM-aliasing feature may be added to transaction runtimes. Aliasing may be page granular—thus persistent memory pages may be replicated in a hash map in DRAM. Transactional reads may be directed to this alias map, whereas writes may be directed to both, the alias map and the target persistent pages. Misses in the alias map may lead to creation of a copy of the persistent page. While this approach seems promising for at least read dominated workloads, since most reads may hit in the faster DRAM, it may be found that it does not lead to performance improvements in various workloads, according to example embodiments. Although the alias map may be faster than persistent memory, every read/write targeted to a persistent memory address may need to be looked up in the alias map, which can lead to an increase in code and data path, and more importantly, an increase in cache misses (e.g. number of cache misses in the array_memcpy microbenchmark with 90% reads increased by about 15%). This lookup itself may be considered to offset the gains that can be had with the alias map.

Persistent K-V Store

A persistent key-value store may be implemented using the transactional API to evaluate its overhead in real-world scenarios, as well as to study the difference between different transactional mechanisms, according to various example embodiments. The key-value store may be implemented as a hash table that uses singly-linked-list separate chaining to resolve hash collisions. The K-V store may support string-type keys and values, and provides a simple put/get interface, in the example embodiments. Clients may connect to the K-V store via UNIX domain socket connections. The K-V store may spawn a thread for each connected client for maximum concurrency.

The tests described herein may utilize a fully instrumented implementation that makes full use of the transactional API features, such as wrapper objects and transactional accessors described herein. Wrapper objects may introduce a level of indirection and therefore overhead, but it may be necessary to support copy-on-write based transactions. To evaluate the overhead introduced by the transactional instrumentations, a hand-optimized version of the K-V store may be implemented that aims at avoiding instrumentation as much as possible, according to example embodiments. The optimized version may bypass the transaction wrapper objects and may only works for redo/undo log based transactions, in some example embodiments.

Figure 16A:
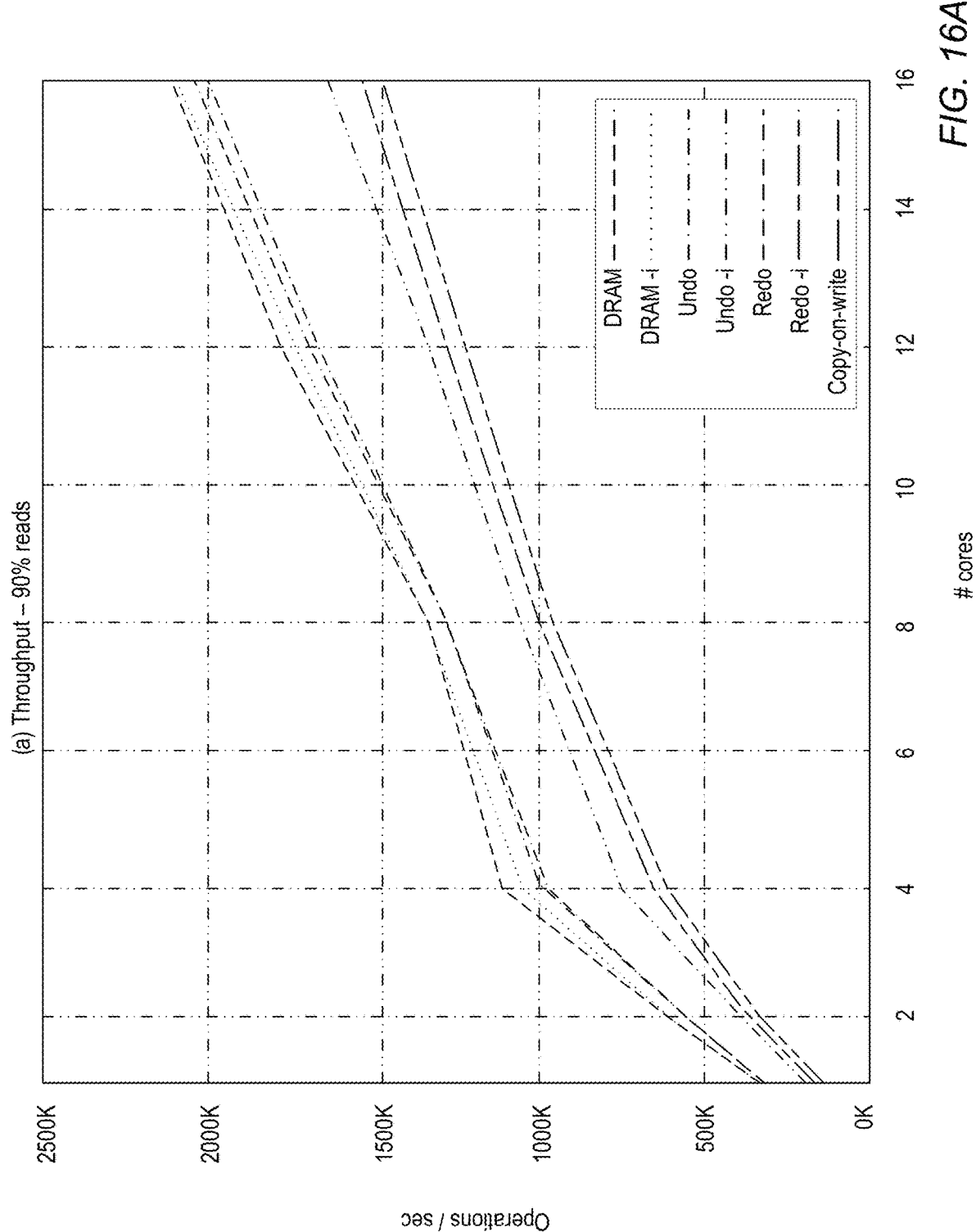
FIGS. 16A-B illustrate system throughput at different core counts, according to one embodiment.
Figure 16B:
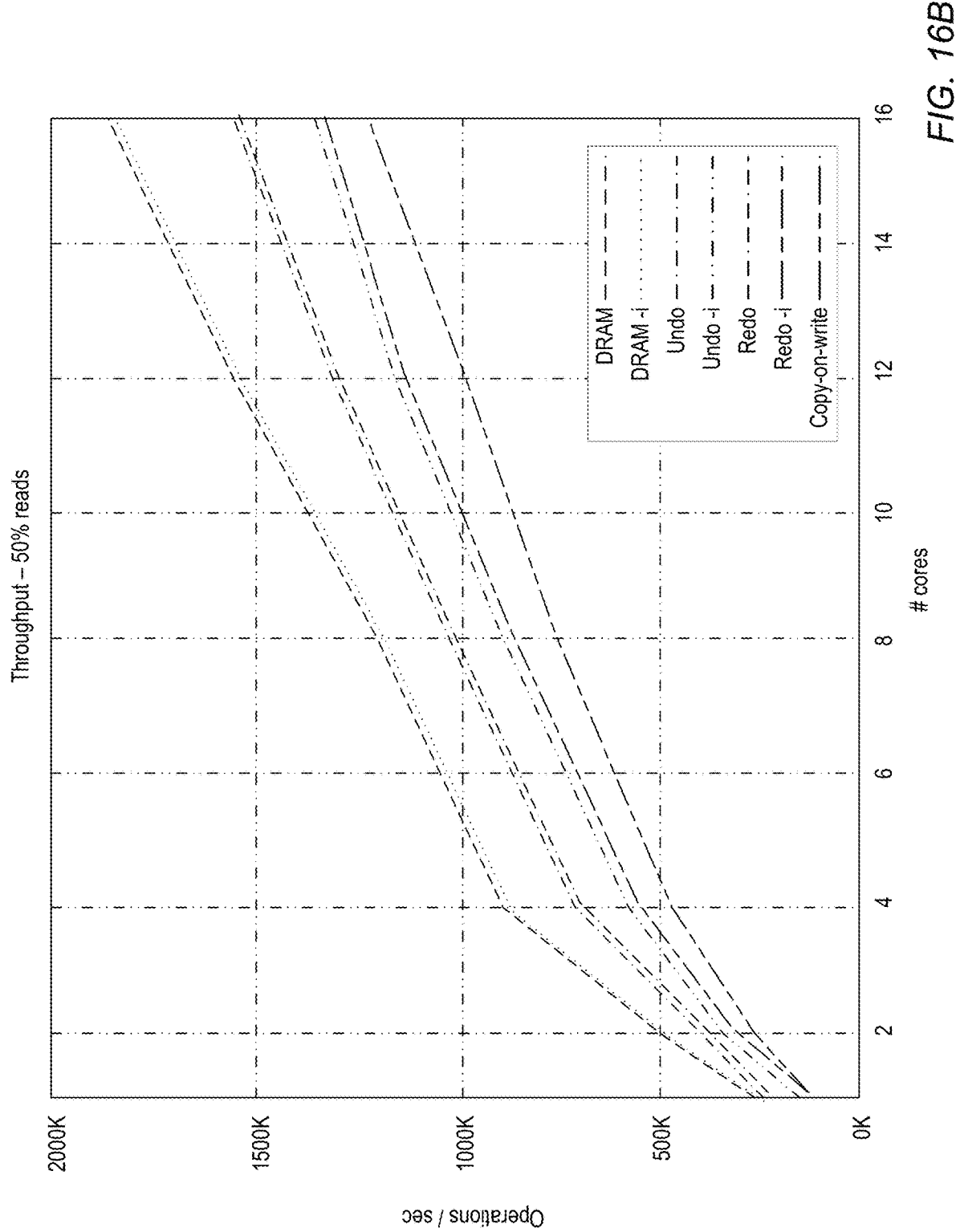

Throughput of these systems may be measured at different core counts, and the results are shown in FIG. 16. FIG. 16 illustrates that the K-V store may scale in various configurations, with undo and redo log possibly performing better than copy-on-write transactions for a fully instrumented version (i.e., denoted with a "-i" suffix in the figure).

Copy-on-write transactions may introduce various requirements that possibly increase the difficulty of achieving a high-performance implementation, according to some embodiments. For example, in one example hash table implementation, every bucket may get copied as copy-on-writes happen, and this may prevent the embedding of locks protecting the bucket directly into the bucket. This may also apply to per-key locks in some embodiments. Thus, in one example instrumented version of the K-V store only bucket-level locks may be used and may be implemented as a separate lock table. This may lead to a certain number of false conflicts in addition to worse locality patterns due to the separate lock table, according to one example embodiment. An optimized version of the K-V store may remove these restrictions by bypassing the wrapper objects.

An example_transactional API may be used to "persistify" memcached, a widely used, high performance, in-memory key-value store. The motivation for building a persistent version of memcached is to accelerate the shutdown-restart-warmup cycle, which can take several hours in some instances because memcached is a nonpersistent key-value store, hosted in DRAM. A persistent memcached can significantly accelerate the warmup time. However, the cache's state must be correctly persistified across failure events such as power failures, kernel crashes, etc.

Figure 17A:
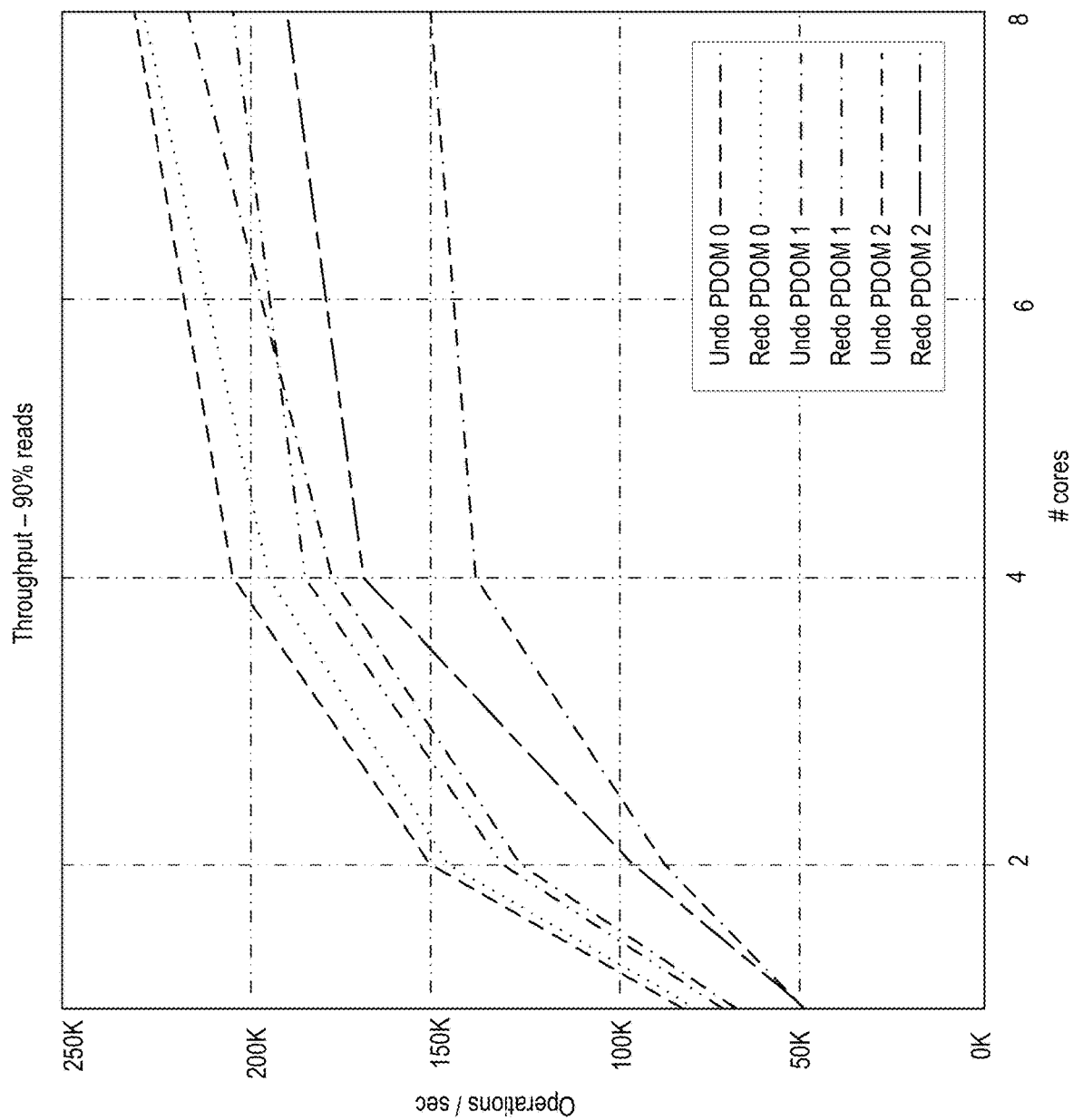
FIGS. 17A-D illustrate a memcached performance with 90/10% and 50/50% get/put ratios, according to one embodiment.
Figure 17B:
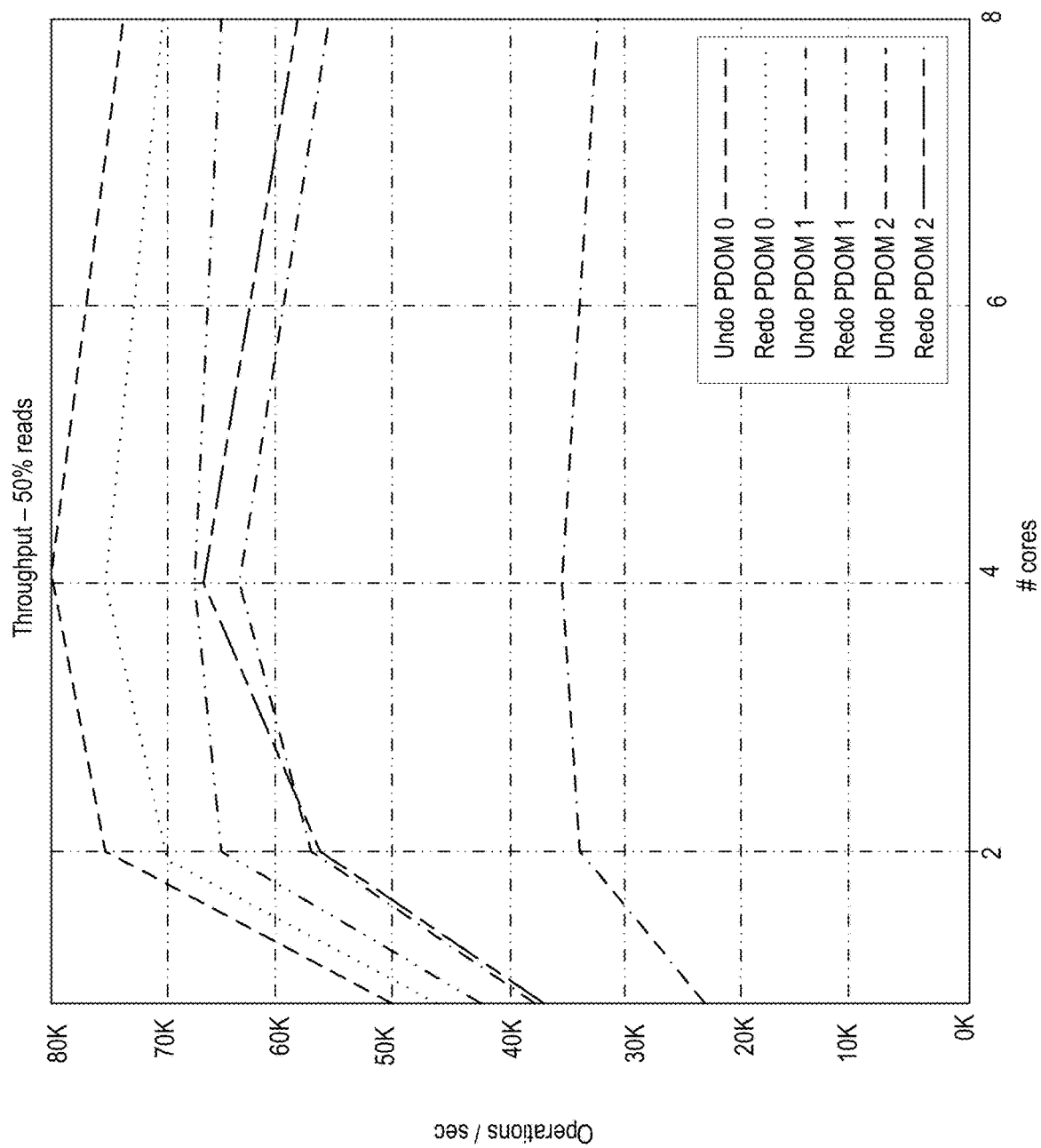
Figures 17C, 17D:
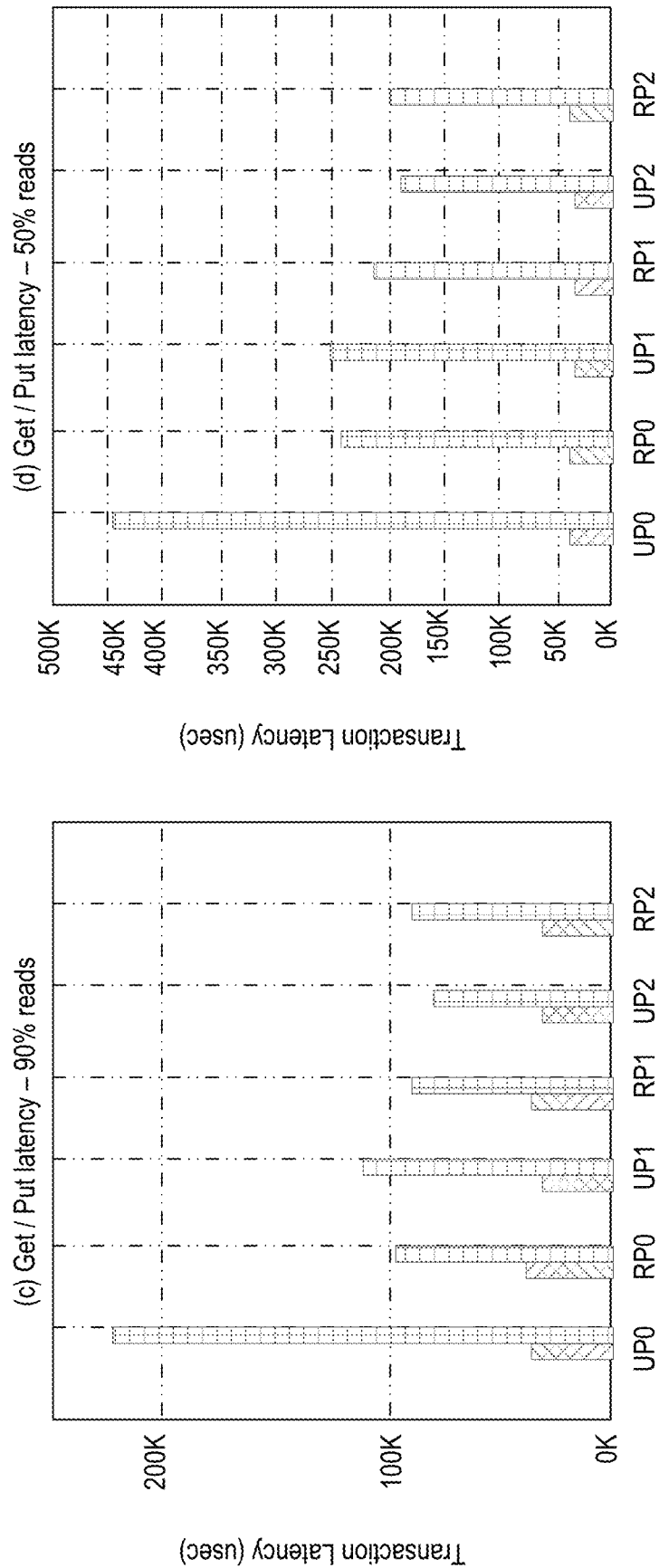

To evaluate memcached a mutilate workload fixing the number of client threads to 8 as used according to one example embodiment. The number of memcached worker threads varied from 1 to 8 in the example embodiment. FIG. 17 shows memcached's performance, in terms of scalability and latency, with 90/10% and 50/50% get/put ratios, respectively. First, note that for 8 thread runs, at 10% puts, the best performing runtime Undo/PDOM-0 has about 10% lower throughput than the original memcached, whereas the same runtime has about 60% lower throughput than the original memcached for 50% puts. This highlights the instrumentation and bookkeeping overheads of transactional runtimes for transactional reads and writes.

Similar to the example microbenchmark results, undo logging performance is better than redo logging for PDOM-2 since persist barriers are nops. However, redo logging catches up with undo logging on the read dominated, 10% put, test for PDOM-1, while slightly outperforming undo logging in the 50% put test. PDOM-0 results are more interesting. While they perform comparably at low thread counts for the read-dominated test, undo logging does not scale as well as redo logging. The explanation appears in the corresponding latency bar chart in FIG. 17C, where the latency of put operations go up significantly for undo logging (over 200 microseconds). Transactions may end up inflating some of the critical sections of memcached. The higher latency of puts leads to greater lock hold intervals, which in turn hinders scalability. In particular, the lock that experiences contention is the slab allocator lock that protects the entire memcached heap. Every put allocates one key-value pair, and may deallocate an older key-value pair that is removed from the hash table (the key-value pair updates are done using the copy-on-write idiom). Once the slab allocator lock is acquired it needs to be released at the end of the enclosing transaction. Since puts are so slow with undo logging, the lock hold times are much greater, leading to higher lock contention and lower scalability. With 50% puts, for PDOM-0, the higher latency of writes (see corresponding bar chart in FIG. 17D) leads to significant slowdown in undo logging transactions at all thread counts.

Computing System

Figure 18:
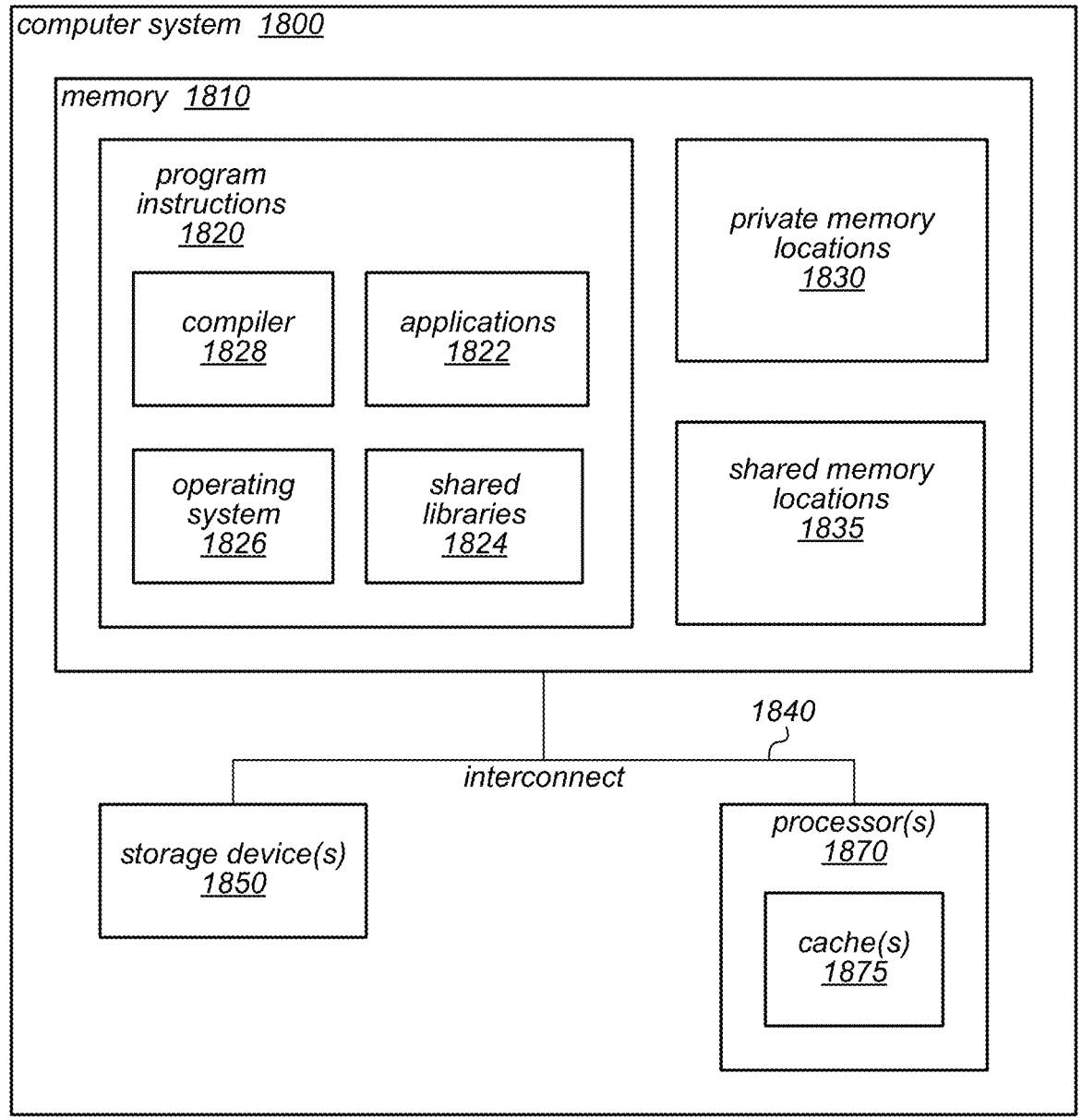
FIG. 18 is a block diagram illustrating one embodiment of a computing system that is configured to implement the mechanisms described herein.

The techniques and methods described herein for improving the performance of persistent memory transactions may be implemented on or by any of a variety of computing systems, in different embodiments. For example, FIG. 18 is a block diagram illustrating one embodiment of a computing system that is configured to implement such techniques and methods, as described herein, according to various embodiments. The computer system 1800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device. In some embodiments, computer system 1800 may be a computing node in a system that implements a NUMA architecture.

Some of the mechanisms for improving the performance of transactions, as described herein, may be provided as a computer program product, or software, that may include a non-transitory, computer-readable storage medium having stored thereon instructions, which may be used to program a computer system 1800 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1800 may include one or more processors 1870; each may include multiple cores, any of which may be single- or multi-threaded. For example, multiple processor cores may be included in a single processor chip (e.g., a single processor 1870), and multiple processor chips may be included in computer system 1800. Each of the processors 1870 may include a cache or a hierarchy of caches 1875, in various embodiments. For example, each processor chip 1870 may include multiple L1 caches (e.g., one per processor core) and one or more other caches (which may be shared by the processor cores on a single processor). In some embodiments, hardware support for persistent memory and/or for persistent memory transactions, as described herein, may be implemented within caches 1875 and/or within other components of processors 1870 or computer system 1800. The computer system 1800 may also include one or more storage devices 1850 (e.g. optical storage, magnetic storage, hard drive, tape drive, solid state memory, etc.) and one or more system memories 1810 (e.g., one or more of cache, SRAM, DRAM, RDRAM, EDO RAM, DDR 10 RAM, SDRAM, Rambus RAM, EEPROM, etc.). In some embodiments, one or more of the storage device(s) 1850 may be implemented as a module on a memory bus (e.g., on interconnect 1840) that is similar in form and/or function to a single in-line memory module (SIMM) or to a dual in-line memory module (DIMM). Various embodiments may include fewer or additional components not illustrated in FIG. 18 (e.g., video cards, audio cards, additional network interfaces, peripheral devices, a network interface such as an ATM interface, an Ethernet interface, a Frame Relay interface, etc.)

The one or more processors 1870, the storage device(s) 1850, and the system memory 1810 may be coupled to the system interconnect 1840. One or more of the system memories 1810 may include program instructions 1820. Program instructions 1820 may be executable to implement one or more applications 1822 (which may include source code and/or executable code for a multithreaded application that accesses shared resources), shared libraries 1824, or operating systems 1826. In some embodiments, program instructions 1820 may include a compiler 1828 (which may be an optimizing compiler configured to determine which, if any, critical sections may be implemented using power-mode transactions). In some embodiments, program instructions 1820 (or more specifically, shared libraries 1824) may include methods for improving the performance of persistent memory transactions, or any other methods that may be invoked by applications 1822.

Program instructions 1820 may be encoded in platform native binary, any interpreted language such as Java™ byte-code, or in any other language such as C/C++, the Java™ programming language, etc., or in any combination thereof. In various embodiments, optimizing compiler 1828, applications 1822, operating system 1826, and/or shared libraries 1824 may each be implemented in any of various programming languages or methods. For example, in one embodiment, optimizing compiler 1828 and operating system 1826 may be based on the Java programming language, while in another embodiment they may be written using the C or C++ programming languages. Similarly, applications 1822 may be written using the Java programming language, C, C++, or another programming language, according to various embodiments. Moreover, in some embodiments, optimizing compiler 1828, applications 1822, operating system 1826, and/shared libraries 1824 may not be implemented using the same programming language. For example, applications 1822 may be C++ based, while optimizing compiler 1828 may be developed using C.

In some embodiments, the program instructions 1820 may include transactional memory support and/or other functions, operations, or procedures for implementing multi-threaded applications that access shared resources, as described herein. Such support and functions may exist in one or more of the shared libraries 1824 (one of which may include a transaction support library), operating systems 1826, or applications 1822, in various embodiments. The system memory 1810 may further comprise private memory locations 1830 and/or shared memory locations 1835 where data may be stored. For example, in some embodiments, shared memory locations 1835 (which may be implemented as a hardware transactional memory) may store data, metadata, or other shared resources that are accessible to multiple, concurrently executing threads, processes, or transactions, in various embodiments. In some embodiments, private memory locations 1830 and/or shared memory locations 1835 may store thread-local flags, lock state information, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of operations that support synchronization within multithreaded applications that access particular shared resources, it should be noted that the techniques and mechanisms disclosed herein for accessing and/or operating on shared resources may be applicable in other contexts in which applications access and/or operate on different types of shared resources than those described in the examples herein and in which different embodiments of the underlying hardware that supports persistent memory transactions described herein are supported or implemented. It is intended that the following claims be interpreted to embrace all such variations and modifications.

What is claimed:

1. A method, comprising: performing, by one or more computing devices comprising persistent memory: writing, by a transaction, a new value to a persistent object, wherein the persistent object comprises a location in the persistent memory; appending an undo log record to an undo log configured to store information regarding previous values of locations in the persistent memory, wherein the undo log record comprises an original value of the persistent object, wherein the original value comprises a value for the location in persistent memory prior to said writing; and issuing a single persist barrier prior to updating a tail pointer of the undo log to point to the appended undo log record, wherein the single persist barrier persists the appended undo log record and a previous value for the tail pointer to the persistent memory, wherein the previous value for the tail pointer points to another undo log record previously appended to the undo log: and updating, subsequent to issuing the single persist barrier, the tail pointer of the undo log to point to the appended undo log record.

2. The method of claim 1, further comprising:
   determining, after a system failure, that a valid undo log record is located after a current end, based on the tail pointer, of the undo log; and
   updating the tail pointer of the undo log to point to the valid ending undo log record.

3. The method of claim 1, wherein said appending comprises storing, in the appended undo log record, a transaction version number identifying the transaction that wrote the new value to the persistent object.

4. The method of claim 1, wherein said appending comprises storing, in the appended undo log record, a checksum value based on the appended undo log record.

5. The method of claim 4, further comprising:
   performing, after a system failure:
      reading a stored version of the appended undo log record from the undo log;
      determining a second checksum value based on the stored version of the appended undo log record; and
      determining whether the stored version of the appended undo log record is valid based at least in part on comparing the second checksum value to the checksum value of the stored version of the appended undo log record.

6. The method of claim 1, further comprising appending a commit record to a transaction's undo log to logically commit the transaction, wherein the commit record indicates that the transaction has been logically committed.

7. The method of claim 6, further comprising:
determining that the transaction performed one or more memory allocations to the persistent memory; and
in response to said determining, persisting state information for the transaction to persistent memory.

8. The method of claim 7, wherein the state information indicates one of: IDLE, RUNNING, ABORTED or COMMITTED.

9. A system, comprising: one or more computing devices comprising persistent memory; and a memory coupled to the one or more computing devices comprising program instructions executable by the one or more computing devices to: write, by a transaction, a new value to a persistent object, wherein the persistent object comprises a location in the persistent memory; append an undo log record to an undo log configured to store information regarding previous values of locations in the persistent memory, wherein the undo log record comprises an original value of the persistent object, wherein the original value comprises a value for the location in persistent memory prior to said writing; and issue a single persist barrier prior to updating a tail pointer of the undo log to point to the appended undo lop record, wherein the simple persist barrier persists the appended undo log record and a previous value for the tail pointer to the persistent memory, wherein the previous value for the tail pointer points to another undo log record previously appended to the undo log: and update, subsequent to issuing the single persist barrier, the tail pointer of the undo log to point to the appended undo log record.

10. The system of claim 9, wherein the program instructions are further executable by the one or more computing devices to:
determine, after a system failure, that a valid undo log record is located after a current end, based on the tail pointer, of the undo log; and
update the tail pointer of the undo log to point to the valid ending undo log record.

11. The system of claim 9, wherein to append the undo log record the program instructions are further executable by the one or more computing devices to:
store, in the appended undo log record, a transaction version number identifying the transaction that wrote the new value to the persistent object.

12. The system of claim 9, wherein to append the undo log record the program instructions are further executable by the one or more computing devices to:
store, in the appended undo log record, a checksum value based on the appended undo log record.

13. The system of claim 12, wherein the program instructions are further executable by the one or more computing devices to:
perform, after a system failure:
reading a stored version of the appended undo log record from the undo log;
determine a second checksum value based on the stored version of the undo log record; and
determine whether the stored version of the appended undo log record is valid based at least in part on a comparison of the second checksum value to the checksum value of the stored version of the appended undo log record.

14. The system of claim 9, wherein the program instructions are further executable by the one or more computing devices to: append a commit record to a transaction's undo log to logically corn m it the transaction, wherein the commit record indicates that the transaction has been logically committed.

15. The system of claim 14, wherein the program instructions are further executable by the one or more computing devices to:
determine that the transaction performed one or more memory allocations to the persistent memory; and
persist state information for the transaction to persistent memory.

16. A non-transitory, computer-readable storage medium storing program instructions that when executed on one or more computer devices comprising persistent memory cause the one or more computing devices to perform: writing, by a transaction, a new value to a persistent object, wherein the persistent object comprises a location in the persistent memory; appending an undo log record to an undo log configured to store information regarding previous values of locations in the persistent memory, wherein the undo log record comprises an original value of the persistent object, wherein the original value comprises a value for the location in persistent memory prior to said writing; and issuing a single persist barrier prior to updating a tail pointer of the undo log to point to the appended undo log record, wherein the single persist barrier persists the appended undo log record and a previous value for the tail pointer to the persistent memory, wherein the previous value for the tail pointer points to another undo log record previously appended to the undo log; and updating, subsequent to issuing the single persist barrier, the tail pointer of the undo log to point to the appended undo log record.

17. The non-transitory, computer-readable storage medium of claim 16, wherein the program instruction further cause the one or more computing devices to perform:
determining, after a system failure, that a valid undo log record is located after a current end, based on the tail pointer, of the undo log; and
updating the tail pointer of the undo log to point to the valid undo log record.

18. The non-transitory, computer-readable storage medium of claim 16, wherein to append the undo log record the program instructions further cause the one or more computing devices to perform:
storing, in the appended undo log record, a transaction version number identifying the transaction that wrote the new value to the persistent object.

19. The non-transitory, computer-readable storage medium of claim 16, wherein to append the undo log record the program instructions further cause the one or more computing devices to perform:
storing, in the appended undo log record, a checksum value based on the appended undo log record.

20. The non-transitory, computer-readable storage medium of claim 16, wherein the program instruction further cause the one or more computing devices to perform: appending a commit record to a transaction's undo log to logically commit the transaction, wherein the commit record indicates that the transaction has been logically committed.

* * * * *

UNITED STATES PATENT AND TRADEMARK OFFICE
CERTIFICATE OF CORRECTION

PATENT NO. : 10,691,559 B2  
APPLICATION NO. : 15/675526  
DATED : June 23, 2020  
INVENTOR(S) : Marathe et al.

Page 1 of 1

It is certified that error appears in the above-identified patent and that said Letters Patent is hereby corrected as shown below:

On the Title Page

In Column 2, under Other Publications, Line 1, delete "Transctional" and insert -- Transactional --, therefor.

On second page, in Column 2, under U.S. Patent Documents, Line 6, delete ""Mnenosyne:" and insert -- "Mnemosyne: --, therefor.

In the Specification

In Column 16, Line 34, delete "by" and insert -- be --, therefor.

In the Claims

In Column 27, Line 23, in Claim 9, delete "lop" and insert -- log --, therefor.

In Column 27, Line 24, in Claim 9, delete "simple" and insert -- single --, therefor.

In Column 28, Line 4, in Claim 14, delete "corn m it" and insert -- commit --, therefor.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*